(12) United States Patent
Takemura et al.

(10) Patent No.: US 8,243,378 B2
(45) Date of Patent: Aug. 14, 2012

(54) HOLDING APPARATUS, TELESCOPE, AND OPTICAL APPARATUS

(75) Inventors: Yukio Takemura, Utsunomiya (JP); Kouhei Imoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 12/580,193

(22) Filed: Oct. 15, 2009

(65) Prior Publication Data

US 2010/0097697 A1  Apr. 22, 2010

(30) Foreign Application Priority Data

Oct. 17, 2008  (JP) ................. 2008-268866

(51) Int. Cl.
*G02B 7/02* (2006.01)
(52) U.S. Cl. ........................... 359/820; 359/819
(58) Field of Classification Search ............ 359/811, 359/819, 820
See application file for complete search history.

(56) References Cited

U.S. PATENT DOCUMENTS

| | | | |
|---|---|---|---|
| 7,675,695 B2 * | 3/2010 | Mizuno | 359/811 |
| 7,729,065 B2 * | 6/2010 | Schoeppach et al. | 359/819 |
| 2006/0268433 A1 * | 11/2006 | Thomas | 359/811 |
| 2008/0291555 A1 * | 11/2008 | Okada | 359/820 |

FOREIGN PATENT DOCUMENTS

JP  05-036766  5/1993

* cited by examiner

*Primary Examiner* — Ricky Mack
*Assistant Examiner* — Mahidere Sahle
(74) *Attorney, Agent, or Firm* — Canon USA Inc IP Division

(57) ABSTRACT

A holding apparatus for holding an optical element includes: a barrel; a first member having one end connected to the barrel, and an opposite end located apart from the one end in a direction perpendicular to an axis of the barrel and outside the barrel; a second member passing through the hole and having one end connected to the opposite end of the first member and the other end located apart from the opposite end of the first member in the direction and inside the barrel. Their linear expansion coefficients and dimensions are configured so that the opposite end of the second member is in contact with a side of the optical element, and the amounts of displacement of the side of the optical element and the opposite end of the second member due to a change in temperature correspond to each other.

21 Claims, 21 Drawing Sheets

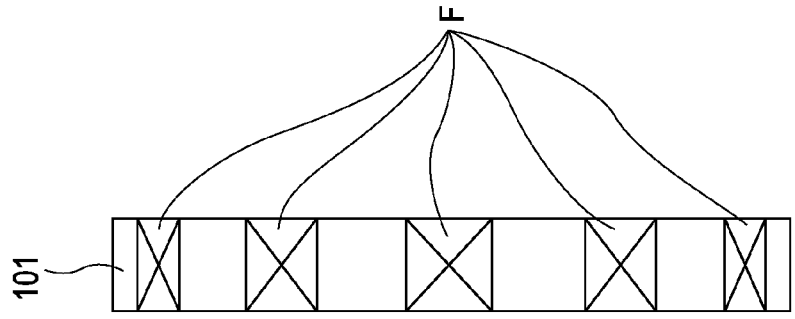
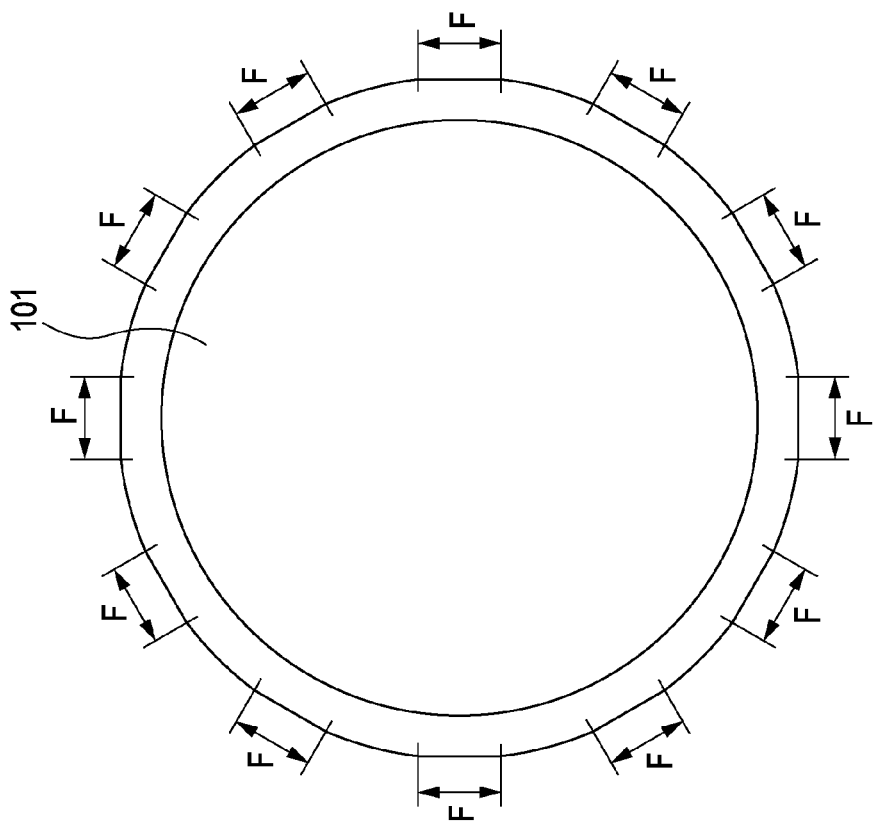

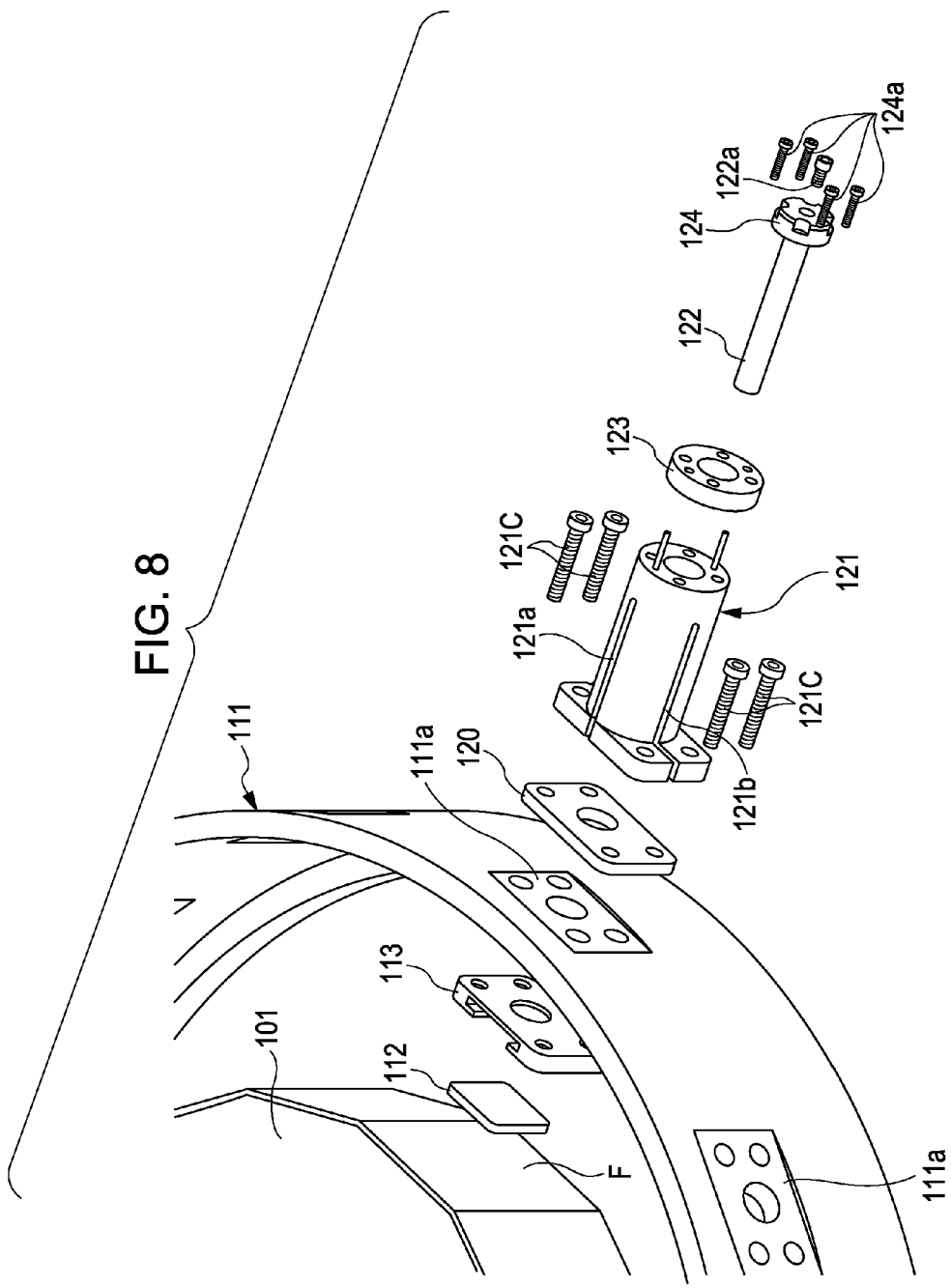

US 8,243,378 B2

HOLDING APPARATUS, TELESCOPE, AND OPTICAL APPARATUS

BACKGROUND OF THE INVENTION

1. Field of the Invention

The present invention relates to a holding apparatus for holding an optical element, a telescope including the holding apparatus, and an optical apparatus including the holding apparatus.

2. Description of the Related Art

Heretofore, mechanisms for holding an optical element in a telescope have been known in the art and one of them is disclosed in Japanese Patent Publication No. 05-036766. According to Japanese Patent Publication No. 05-036766, a support made of crystalline plastic, a material having a higher thermal expansion coefficient than that of a metal is arranged between a reflector (one of optical devices) and a barrel made of metal.

In other words, a crystalline plastic material is placed between the reflector and the barrel at ordinary temperature. At higher temperatures, the diameter of the barrel made of a material with a high thermal expansion coefficient becomes higher than the diameter of the reflector. As a result, a difference between the outer diameter of the reflector and the inner diameter of the barrel is caused and a gap is consequently formed between these members. In Japanese Patent Publication No. 05-036766, a holding mechanism is designed so that the gap will be plugged with a crystalline plastic material with a higher thermal expansion coefficient than that of the barrel.

In addition, Japanese Patent Publication No. 05-036766 describes that "even in a state that a rapid decrease in surrounding temperature of a main reflector 3 occurs and a support 9 is pressed against the outer surface of the main reflector 3, the support 9 tends to be deformed by distortion to prevent the main reflector 3 from causing strain deformation and damages". In general, the optical system of a telescope is constructed of a plurality of optical elements including reflectors, lenses, and so on. However, it is well known that aberration, or so-called decentration aberration, occurs to cause a decrease in image quality (optical performance) when the light axes of the respective optical elements are not aligned in line. In Japanese Patent Publication No. 05-036766, there is a description that a reflector-holding member is "deformable", so that it may tend to cause decentration aberration when the reflector-holding member is under load of a lens.

In particular, when observing an astronomical object near the horizon, the optical axis of a telescope is substantially horizontal (parallel to the ground) and the weight of a lens in the telescope is supported by the lower part of a barrel via the periphery of the lens. If the holding member located at the lower part is made of a soft plastic material or the like, the holding member may be deformed and decenter the lens held by the holding member downward. The weight of the lens becomes heavier as the aperture of the lens becomes larger. Therefore, the use of a deformable material for a lens-supporting portion may cause a considerable deformation of such a portion and, as a result, a decrease in optical performance of the optical system due to the decentring of the lens.

SUMMARY OF THE INVENTION

The present invention provides, for example, a holding apparatus advantageous in a stability of an optical performance of an apparatus including an optical element with respect to temperature changes and attitude changes.

An aspect of the present invention is a holding apparatus configured to hold an optical element, the apparatus includes: a barrel having a hole on a side thereof and housing the optical element; a first member having one end connected to the barrel, and an opposite end located apart from the one end in a direction perpendicular to an axis of the barrel and outside the barrel; a second member passing through the hole and having one end connected to the opposite end of the first member, and an opposite end located apart from the opposite end of the first member in the direction and inside the barrel, wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other.

According to the above aspect of the present invention, a holding apparatus advantageous in a stability of an optical performance of an apparatus including an optical element with respect to temperature changes and attitude changes can be provided, for example.

In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

Further features of the present invention will become apparent from the following description of exemplary embodiments with reference to the attached drawings.

BRIEF DESCRIPTION OF THE DRAWINGS

The accompanying drawings, which are incorporated in and constitute of the specification, illustrate embodiments of the invention and, together with the description, serve to explain the principles of the invention.

FIG. 7 is a schematic diagram illustrating flat portions on the periphery of a lens according to a third embodiment.

FIG. 8 is an explanatory diagram of the third embodiment.

DESCRIPTION OF THE EMBODIMENTS

A holding apparatus according to a first embodiment of the present invention will be described with reference to FIG. 1, FIG. 2, FIG. 3, and FIG. 4.

Figure 1:
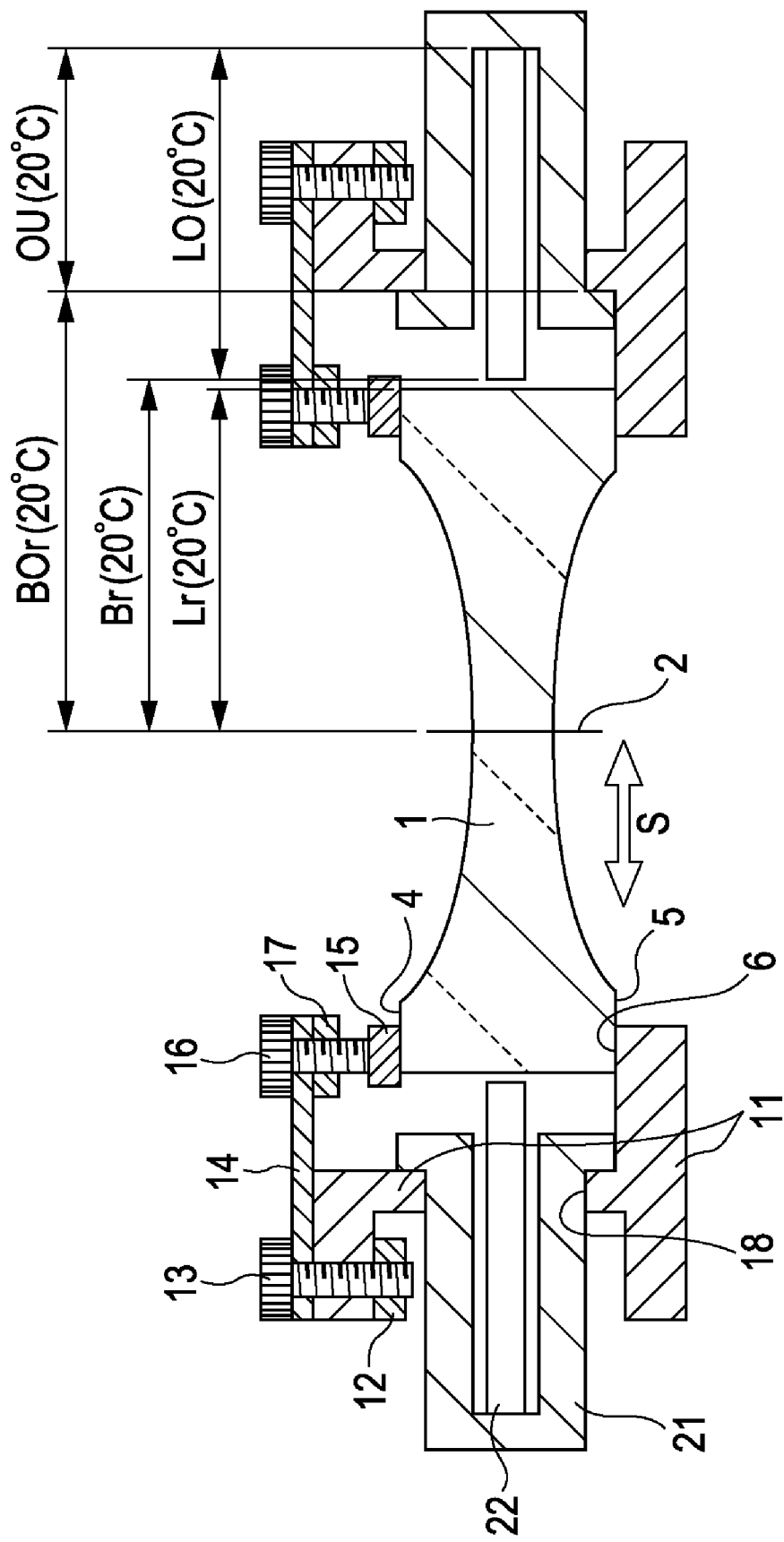
FIG. 1 is an explanatory diagram of a first embodiment.

FIG. 1 is a cross-sectional diagram illustrating the configuration of the holding apparatus in which a barrel houses one of plural lenses, a circular concave lens 1, in a telescope. In FIG. 1, the concave lens 1 has an upper surface portion 4 and a under surface portion 5 adjacent to the periphery of the lens 1. Both the upper surface portion 4 and the under surface portion 5 are formed in flat surfaces in parallel with a plane perpendicular to the light axis 2 of the lens 1.

The barrel 11 is formed in a ring shape and surrounds the periphery of the circular lens 1. A lens-receiving portion 6 of the barrel 11 is formed of a flat surface and allows the lens 1 to smoothly shift in the direction of arrow "S" in FIG. 1. A lens-retaining ring 14 is arranged on the upper part of the barrel 11 via a screw 13 and a nut 12 and, in the inside of the ring 14, a screw 16 provided with a lens-pressing pad 15 on the end thereof is held and fixed by tightening a nut 17 on the screw 16. The lens-pressing pad 15 presses against the upper surface portion 4 of the lens 1. The pressing force of the ring 14 against the lens 1 through the pad 15 is a force enough to prevent the lens 1 from falling from the barrel 11 shown in FIG. 1 even if the barrel 11 is turned upside down. However, the force is set to a predetermined level that allows the lens to shift in the radial direction thereof (the direction of allow "S") in the barrel 11 even if the barrel 11 is in any attitude.

Figure 4:
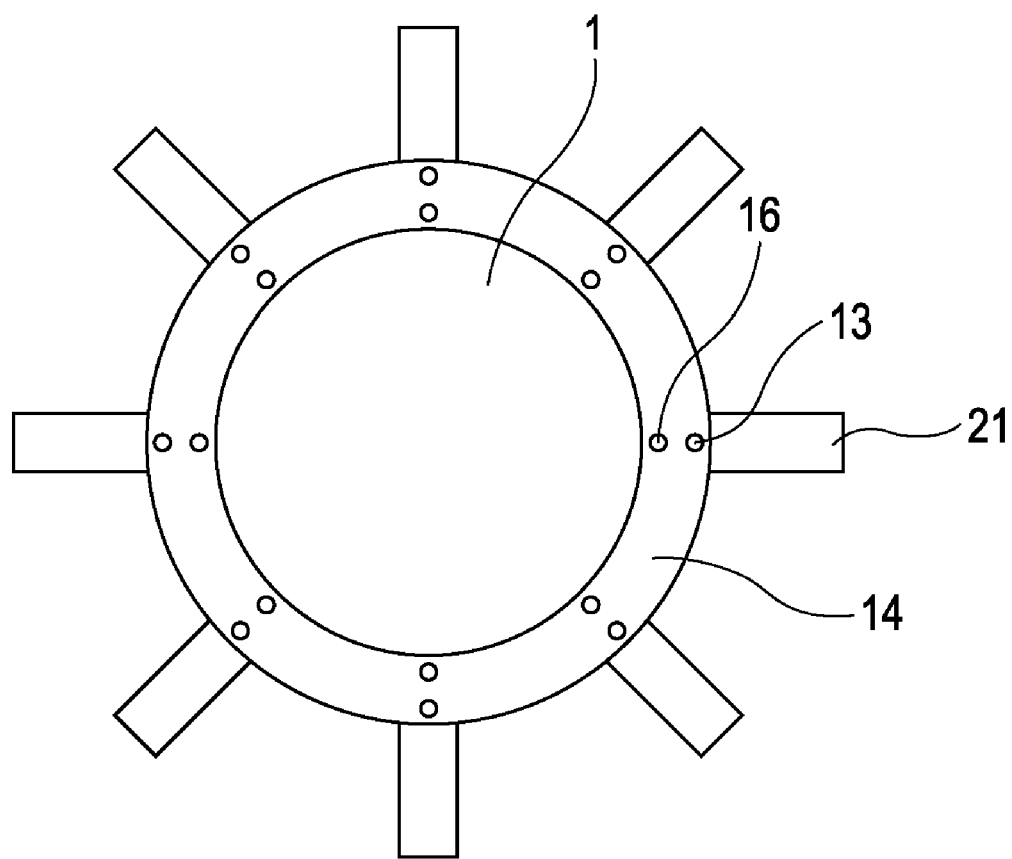
FIG. 4 is a diagram when viewing the configuration of FIG. 1 in the direction along a light axis.

In addition, eight holes 18 are formed in the periphery (lateral side) of the barrel 11 at equiangular intervals. An outer 21 (also referred to as a first member), a cup-shaped member having a flanged open end, is inserted from the inside of the barrel 11 into each of the holes 18 and fixed therein. The configuration of this holding apparatus in the direction along the light axis is illustrated in FIG. 4. In this figure, the outers 21 are radially arranged around the barrel.

In FIG. 1, the flange of the outer 21 has an outer diameter larger than the diameter of the hole 18 in the periphery of the barrel 11 and is responsible for the alignment of the outer 21 with the barrel 11 in the radial direction thereof to prevent the outer 21 from being dropped out of the barrel 11. In other words, one end of the outer 21 is fixed on the barrel 11. Also, the opposite end the outer 21 is distal to the one end thereof in the direction perpendicular to the axis (light axis) of the barrel 11 and located on the outside of the barrel 11.

Figure 2:
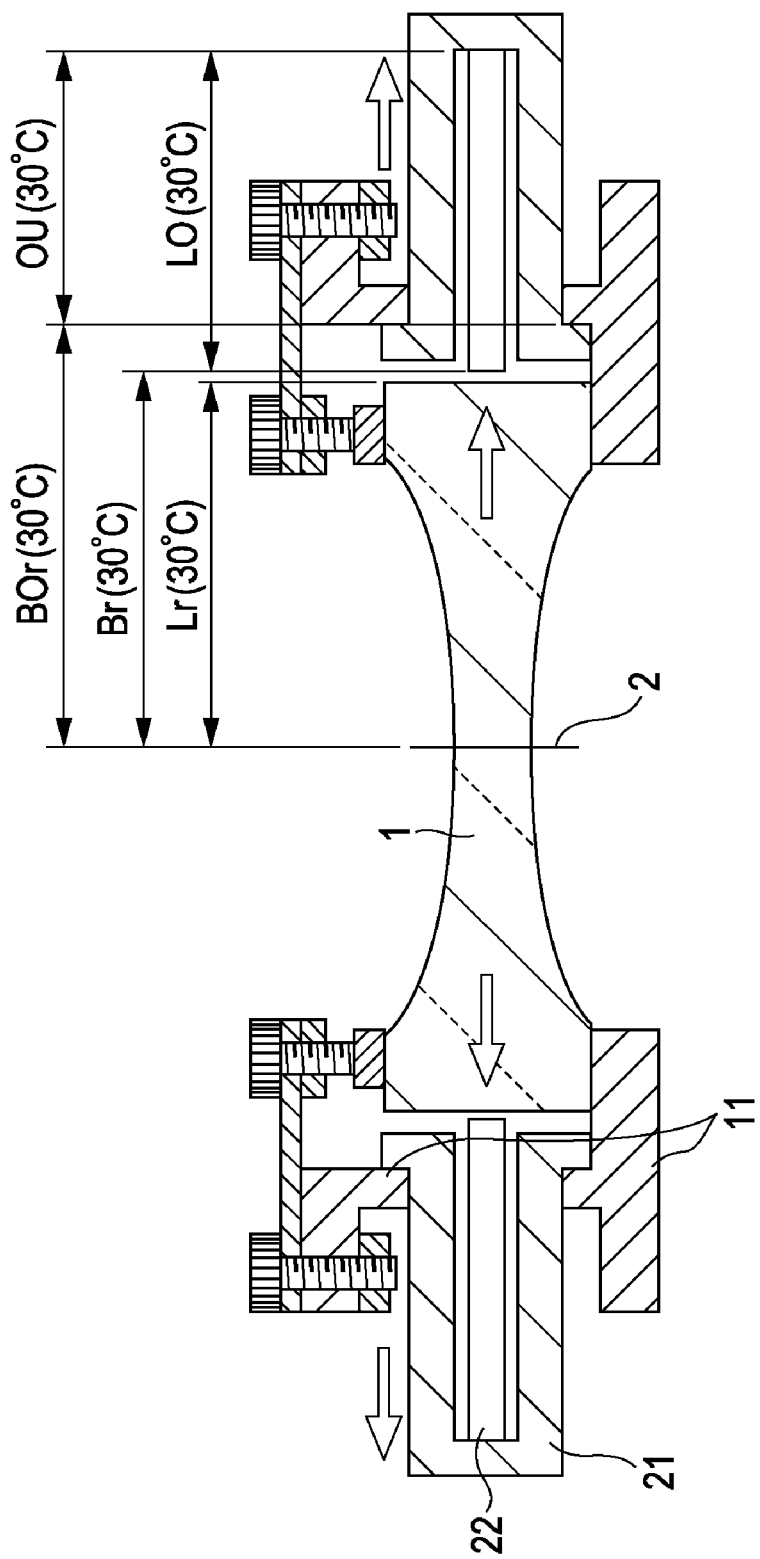
FIG. 2 is an explanatory diagram of effects of an increase in temperature.
Figure 3:
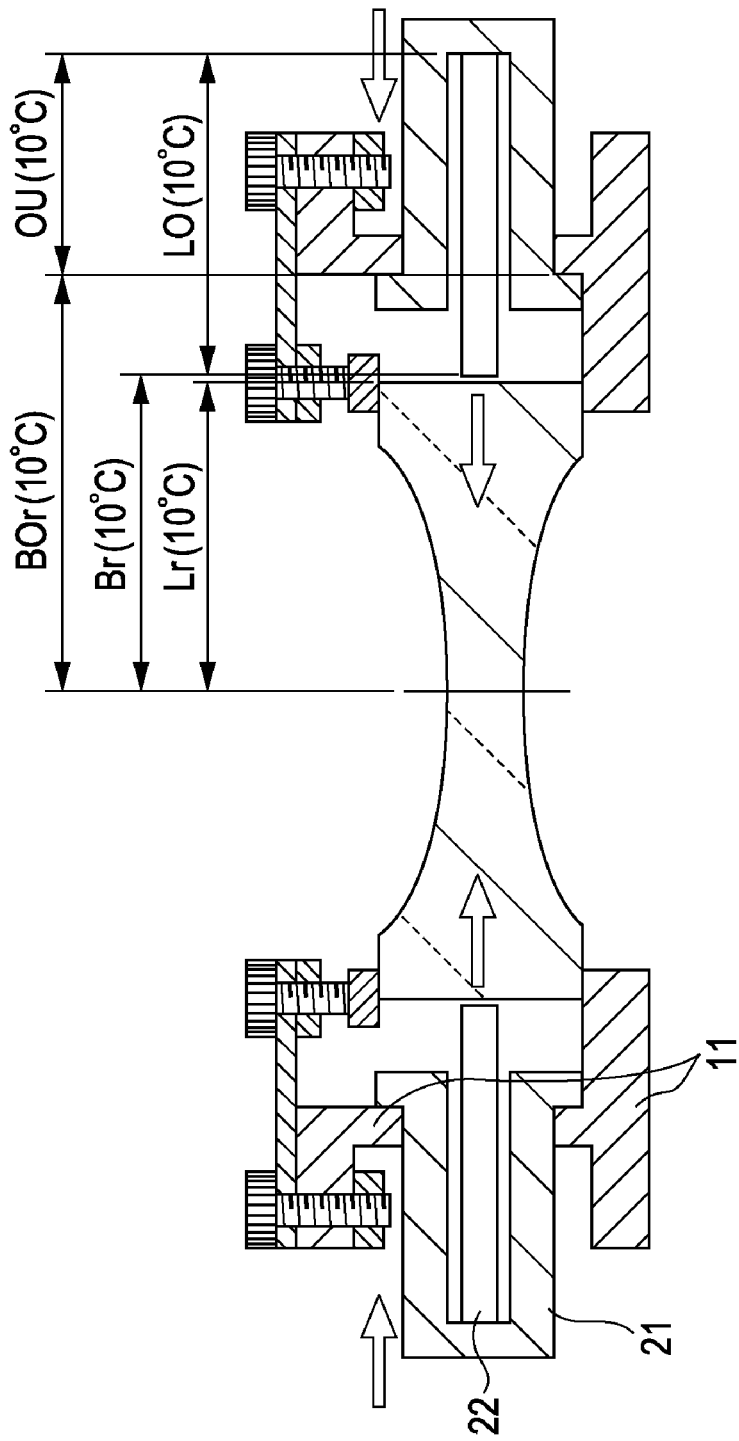
FIG. 3 is an explanatory diagram of effects a decrease in temperature.

A rod 22 (also referred to as a second member) is inserted in the outer 21 and one end of the rod 22 abuts against the opposite end (bottom) of the outer 21, which is distal to the light axis of the lens 1. The rod 22 is guided along the inner wall of the outer 21; the opposite end of the rod 22 touches and slightly presses against the periphery (lateral side) of the lens 1. In other words, the rod 22 passes through the hole 18 and one end of the rod 22 is then fixed on the above opposite end of the outer 21. In addition, the opposite end of the rod 22 is distal to the above opposite end of the outer 21 in the direction perpendicular to the axis of the barrel 11 and located outside of the barrel 11. In FIG. 1, FIG. 2, and FIG. 3, a gap is formed between the periphery of the lens 1 and the tip end of the rod 22. Alternatively, any gap may not be formed between the periphery of the lens and the tip end of the rod 22 and they may be kept in contact with each other.

The configuration of this holding apparatus will be described in detail. The material quality (linear expansion coefficient) and the length (dimension) of each of the outer 21 and the rod 22 may be suitably determined on the basis of the material quality (linear expansion coefficient) and the radius (dimension) of the lens 1, the material quality (linear expansion coefficient) and the radius (dimension) of the barrel 11 on which the outer 21 is fixed, or the like. In other words, they can be determined using the following relational expression.

$$Lr \cdot \alpha_L = BOr \cdot \alpha_B + OU \cdot \alpha_{OU} - LO \cdot \alpha_{LO} \quad \text{(Equation 1)}$$

(Dimensional change of lens radius)=(positional change of the tip of rod corresponding to radius)

Lr: Radius of lens (portion where the rod abuts against);

$\alpha_L$: Linear expansion coefficient of lens;

BOr: Radius of portion on which the outer of the barrel is fixed;

$\alpha_B$: Linear expansion coefficient of the barrel;

OU: Depth of the bottom, where the rod abuts against; from the position, where the outer is fixed on the barrel;

$\alpha_{OU}$: linear expansion coefficient of outer;

LO: Length of rod; and $\alpha_{LO}$: Linear expansion coefficient of rod.

Hereinafter, examples of the materials, characteristics, and dimensions of the structural members will be described. The lens 1, which is used in this embodiment, is made of BSL7Y, a glass material available from OHARA Inc., and the periphery thereof has a radius (Lr) of 400 mm (20° C.). In addition, the linear expansion coefficient $\alpha_L$ of the lens 1 is $6.8 \times 10^{-6}$ [1/K] as described in the catalog from OHARA Inc.

The barrel 11 is made of cordierite available from KYOCERA CORP., and the radius BOr of the outer-abutting portion of the barrel 11 is 420 mm (20° C.). In addition, the linear expansion coefficient $\alpha_B$ of the lens 1 is $0.1 \times 10^{-6}$ [1/K] as described in the catalog from OHARA Inc.

The outer 21 is made of zinc alloy available from ZINC EXCEL CORP., and the linear expansion coefficient $\alpha_{OU}$ thereof is $28 \times 10^{-6}$ [1/K] from data disclosed on the Website of ZINC EXCEL CORP.

The rod 22 is made of super invar available from SHIN-HOKOKU STEEL CO., LTD., and the linear expansion coefficient $\alpha_{LO}$ thereof is $1.0 \times 10^{-6}$ [1/K] as described in the catalog from SHINHOKOKU STEEL CO., LTD.

The length (LO) of the rod 22 can be determined from the length (OU) of the outer 21, the radius (Lr) of the lens 1, and the radius Br of the abutting portion of the barrel 11 by the following relational expression:

$$LO = OU + BOr - Lr \quad \text{(Equation 2)}$$

The length of the outer 21 can be expressed by the following equation derived from Equation 1 and Equation 2.

$$OU = (Lr \cdot \alpha_L - BOr \cdot \alpha_B + (BOr - Lr) \cdot \alpha_{LO})/(\alpha_{OU} - \alpha_{LO}) \quad \text{(Equation 3)}$$

If the above structural members have the above physical properties and dimensions, then the length (OU) of the outer 21 is as follows:

OU (calculated value)=99.5926 mm

Thus, the processing dimension of the outer 21 is defined as:
OU=99.6000 mm

In addition, from Equation 2, the length of the rod 22 is as follows:
LO (calculated value)=109.5926 mm
Thus, the processing dimension of the rod 22 is defined as:
LO=109.6000 mm Referring now to FIG. 2 and FIG. 3, the behaviors of the holding apparatus having the above structure under predetermined thermal conditions: (A) when the ambient temperature thereof increases by 10° C. from 20° C. to 30° C.; and (B) when the ambient temperature thereof decreases by 10° C. from 20° C. to 10° C.

<(A) 10° C. Increase in Temperature from 20° C. to 30° C.>

In FIG. 2, the radius (Lr) of the lens 1 at a temperature of 30° C. is calculated as follows:

$$Lr(30° C.)=Lr(20° C.) \times (1+(\alpha_L \times 10° C.))=400 \times (1+(6.8 \times 10^{-6} \times 10))=400.0272 \text{ mm} \quad (A)$$

Br(30° C.), a length corresponding to the distance from the center of the lens 1 to the position of the tip of the rod 22 being touched on the periphery of the lens 1, is derived from the dimensions of the outer 21 and the rod 22 and represented as follows:

$$Br(30° C.)=BOr(30° C.)+OU(30° C.)-LO(30° C.)$$

First, the radius (BOr) of the outer-abutting portion of the barrel 11 (30° C.) is expressed as follows:

$$BOr(30° C.)=BOr(20° C.) \times (1+(\alpha_B \times 10° C.))=410 \times (1+(0.1 \times 10^{-6} \times 10))=410.0005 \text{ mm}$$

A distance OU (30° C.) from the portion of the outer 21, which is fixed on the barrel 11, to the tip of the rod 22, which is distal to the light axis of the lens 1, is expressed as follows:

$$OU(30° C.) = OU(20° C.) \times (1 + (\alpha_{OU} \times 10° C.))$$
$$= 99.6000 \times (1 + (28 \times 10^{-6} \times 10))$$
$$= 99.6279 \text{ mm.}$$

The length LO of the rod 22 (30° C.) is expressed as:

$$LO(30° C.)=LO(20° C.) \times (1+(\alpha_{LO} \times 10° C.))$$
$$=109.6000 \times (1+(1.0 \times 10^{-6} \times 10))=109.6011 \text{ mm}$$

Br(30° C.), a length corresponding to the distance from the center of the lens 1 to the position of the tip of the rod 22 being touched on the periphery of the lens 1, is expressed as:

$$Br(30° C.)=BOr(30° C.)+OU(30° C.)-LO(30° C.)=410.0005+99.6279-109.6011=400.0273 \text{ mm} \quad (B)$$

Therefore, an expansion error between the radius (A) of lens 1 and the radius (B) of the rod 22 with a 10° C. rise in the ambient temperature is 0.0001 mm. The expansion error is about 1/200 with respect to the expansion amount of the lens 1 and the expansion error will have extremely little effect on the optical performance of the lens even if the lens is decentered in proportion to the degree of the expansion error. Furthermore, since the tip of each rod 22 is outwardly expanded only 0.0001 mm toward the lens 1. Therefore, there is no stress caused on the lens 1 because the lens 1 is not tightened by the rods 22 even if an increase in temperature occurs.

If the expansion error is calculated using the dimension (OU) of the outer 21 (calculated value) and the dimension (LO) of the rod 22 (calculated value) obtained by Equation 3 and Equation 2, then the expansion error is zero (0). The expansion error is a numerical error caused by rounding the dimensions of the outer and the rod (calculated values) toward "processing dimensions". In other words, according to the above design procedure, the expansion error can be freely defined by finely adjusting the processing dimensions of the outer 21 and the rod 22 with reference to the materials and dimensions of the respective members obtained by Equation 1. In this case, it is clear that the expansion error can be also defined similarly by finely adjusting any of other members or adjusting the linear expansion coefficient of each member. It is preferable to set the expansion error so that it will tolerate processing errors of members, variations in linear expansion coefficient, and so on. In other words, the expansion error is kept within minute scales and set to allow the amount of displacement of the lateral side of the optical element to coincide with the amount of displacement of the tip (the above opposite end) of the rod (second member) due to variations in temperature (expansion and contraction). Here, the term "coincide" means that these displacements are substantially equal while allowing the difference between them within limits that do not affect on the desired optical performances.

Next, the outer and the rod may be deformed by the weight of the lens when the astronomical object to be observed is located near the horizon. The amount of deformation of the outer/rod can be calculated as described below.

The dimensions and physical properties of the respective structural members in the present embodiment are as follows: The lens is 800 mm in diameter, approximately 60 mm in thickness, and approximately 80 kg in weight. The rod is 16 mm in diameter and made of super invar with a Young's module of 114.7 GPa. The outer (here, in the form of a cylinder) is 40 mm in outer diameter, 20 mm in inner diameter, and made of zinc alloy with a Young's modulus of 91 GPa. If two sets of the outer and the rod extended downward in the gravity direction support the lens while the barrel is in a horizontal state, the outer/rod may be deformed by approximately 0.002 mm due to the weight of the lens. However, this amount of deformation is sufficiently smaller than the thermal deformation of the lens, so that it can be an allowable level with respect to influence on optical performance.

On the other hand, a material described in Japanese Patent Publication No. 05-036766 is Duracon (trade name, manufactured by Polyplastics Co., Ltd.). From the catalog available from Polyplastics Co., Ltd., it has a Yong's modulus of 7.9 GPa. When the rod is prepared using Duracon, the resulting outer/rod is deformed by approximately 0.028 mm due to the weight of the lens. The deformation volume of the outer/rod is proximate to the expansion amount of the lens, so that any supporting mechanism may be unnecessary in this embodiment. In addition, the rod should have a diameter of 64 mm or more to attain the same deformation volume as that of the outer/rod of the present embodiment (i.e., approximately 0.002 mm), but it is unfavorable that the diameter of the rod is larger than the thickness of the lens. Therefore, there is a need of a large space between the lenses, but it is not preferable because of leading to a large-sized optical apparatus, such as a telescope. Consequently, it is evident that the use of Duracon, the Yong's modulus thereof is low, is impractical in the present embodiment.

In the case that the linear expansion coefficient of the material varies with temperature (temperature dependency), a change in linear expansion coefficient of the material may be formulized and substituted for the linear expansion coefficient in Equation 1. Therefore, both the rod and the outer, which have their own predetermined dimensions, may cause spaces to the lens when an increase or a decrease in temperature occurs or may press against the lens when, conversely, a decrease or an increase in temperature occurs. Thus, if a material with temperature dependency is used, the dimensions of the rod/outer may be preferably set to reduce a change in optical performance due to the above pressure against the lens as much as possible in consideration of the average and variation range of ambient temperature.

<(B) 10° C. Decrease from 20° C. to 10° C.>

Referring now to FIG. 3, the behaviors of the aforementioned holding apparatus when the ambient temperature of the telescope decreases will be described.

In FIG. 2, the radius (Lr) of the lens 1 at a temperature of 10° C., when the temperature decreases by 10° C. from 20° C. to 10° C., is calculated as follows:

$$Lr(10° C.)=Lr(20° C.)\times(1+(\alpha_L\times-10° C.))=400\times(1+(6.8\times10^{-6}\times-10))=399.9728 \text{ mm} \quad (C)$$

The radius (BOr) of the outer-abutting portion of the barrel 11 (10° C.) is expressed as follows:

$$BOr(10° C.)=BOr(20° C.)\times(1+(\alpha_B\times-10° C.))=410\times(1+(0.1\times10^{-6}\times-10))=409.9996 \text{ mm}$$

A distance OU (10° C.) from the portion of the outer 21, which is fixed on the barrel 11, to the tip of the rod 22, which is distant from the light axis of the lens 1, is expressed as follows:

$$OU(10° C.)=OU(20° C.)\times(1+(\alpha_{OU}\times-10° C.))=99.6000\times(1+(28\times10^{-6}\times-10))=99.5722 \text{ mm}$$

The length LO of the rod 22 (10° C.) is expressed as:

$$LO(10° C.)=LO(20° C.)\times(1+(\alpha_{LO}\times-10° C.))=109.6000\times(1+(1.0\times10^{-6}\times-10))=109.5990 \text{ mm}$$

Br (10° C.), a length corresponding to the distance from the center of the lens 1 to the position of the tip of the rod 22 being touched on the periphery of the lens 1, is expressed as:

$$Br(10° C.)=BOr(10° C.)+OU(10° C.)-LO(10° C.)=409.9996+99.5722-109.5990=399.9728 \text{ mm} \quad (D)$$

Therefore, a contraction error between the radius (C) of lens 1 and the radius (D) of the tip of the rod 22 with a 10° C. decrease in the ambient temperature is substantially zero (0). The degrees of lens decentering and lens stress are sufficiently small and the influences thereof are ignorable, so that high image quality can be preserved.

Figure 5:
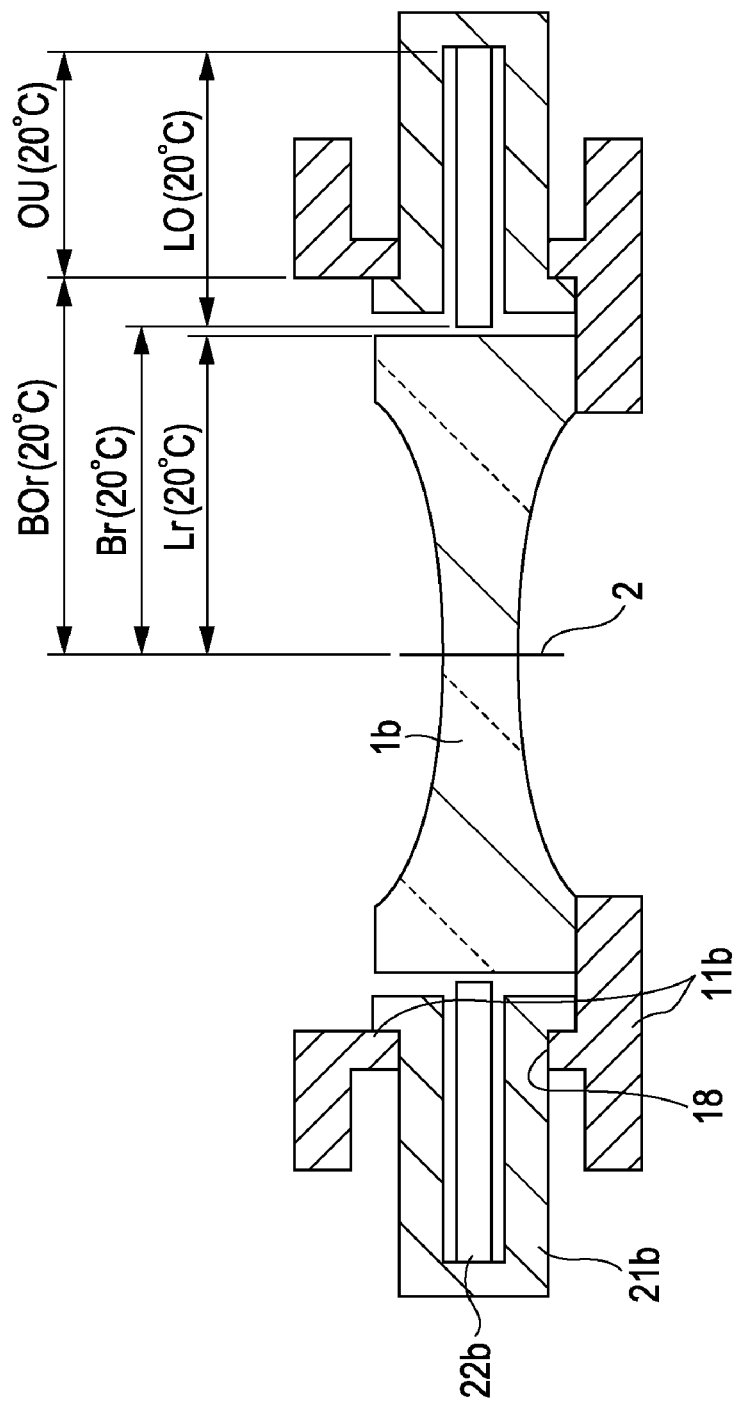
FIG. 5 is an explanatory diagram of a second embodiment.
Figure 6:
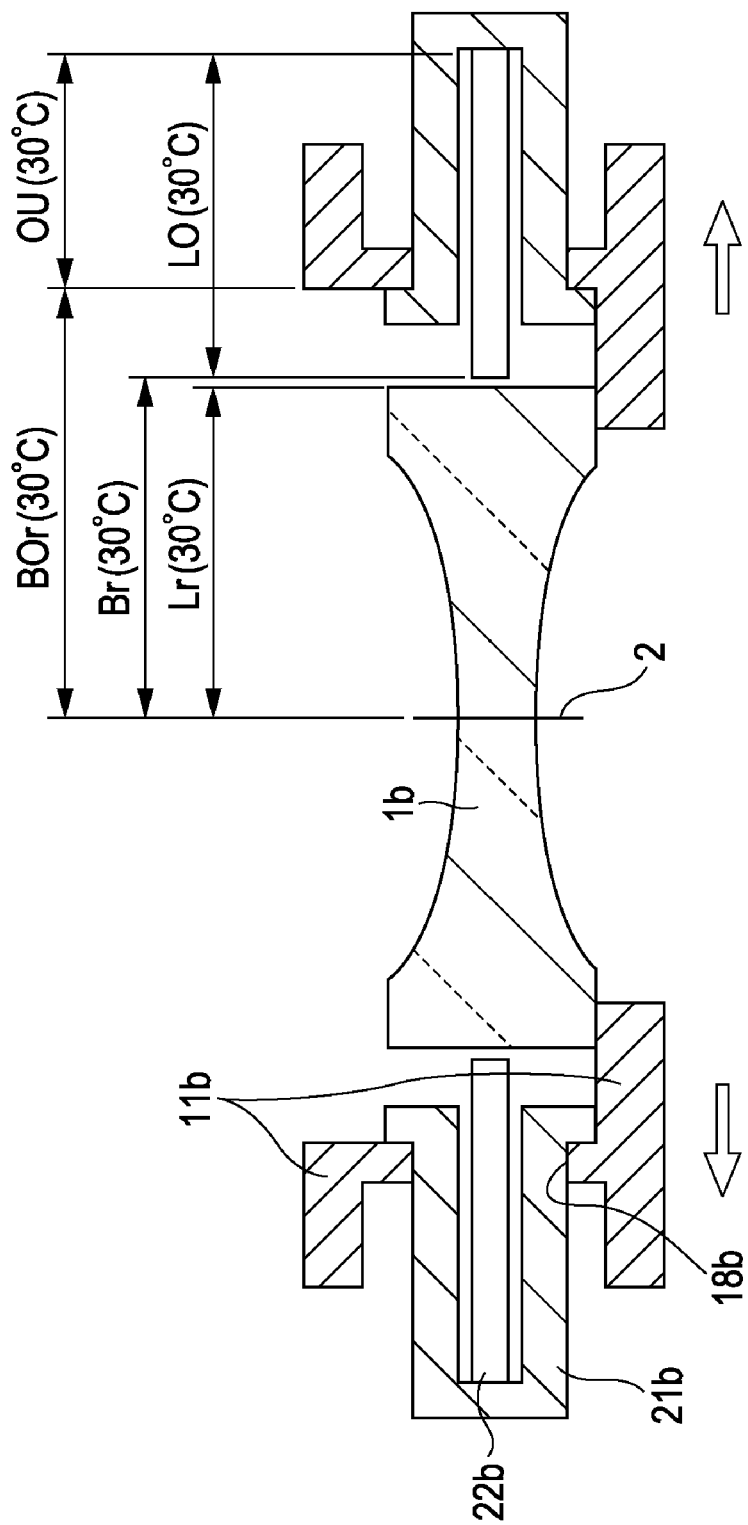
FIG. 6 is an explanatory diagram of effects a decrease in temperature.

A holding apparatus according to a second embodiment (Embodiment 2) of the present invention will be described with reference to FIG. 5 and FIG. 6. The same or similar symbols referenced in Embodiment 1 represent the same or similar structural members, so that the descriptions thereof will be omitted. The configurations of the respective structural members for holding a lens 1b are the same as those illustrated in FIG. 1, so that the descriptions thereof will be omitted from the figure.

In this embodiment, the lens 1b is made of a material with a low linear expansion coefficient and, in contrast, a barrel 11b is made of a material, such as a metal, with a high linear expansion coefficient. In this embodiment, furthermore, an outer 21b is made of a material with a low linear expansion coefficient and, in contrast, a rod 22b is made of a material with a high linear expansion coefficient.

In this embodiment, furthermore, the relationship expressed by Equation 1 can be also established. The material and length of each of the outer 21b and the rod 22b may be suitably determined depending on the material of the lens 1b (i.e., the linear expansion coefficient and the radius thereof), the material of the barrel 11b for fixing the outer 21b thereon, and so on. Hereinafter, examples of materials, characteristics, and dimensions of the structural members will be described.

The lens 1b is prepared using HPFS Fused Silica, a synthetic quartz material, available from Corning Japan, Inc. The linear expansion coefficient $\alpha_L$ of HPFS Fused Silica is $0.5\times10^{-6}$ [1/K] from a catalog of Corning Japan, Inc. The radius Lr of the lens (20° C.) is 400 mm.

The barrel 11b is prepared using carbon steel with a linear expansion coefficient of $10.7\times10^{-6}$ [1/K] transcribed from Science Chronology, 2000 Edition. Furthermore, the radius BOr of the outer-abutting portion of the barrel (20° C.) is 410 mm.

The material of the outer 21b is super invar available from SHINHOKOKU STEEL CO., LTD., and the linear expansion coefficient $\alpha_{OU}$ thereof is $1.0\times10^{-6}$ [1/K] as described in the catalog from SHINHOKOKU STEEL CO., LTD.

The material of the rod 22b is zinc alloy available from ZINC EXCEL CORP., and the linear expansion coefficient $\alpha_{LO}$ thereof is $28\times10^{-6}$ [1/K] from data disclosed on the Website of ZINC EXCEL CORP.

Just as in the case of Embodiment 1, the length (OU) of the outer can be determined from the radius (Lr) of the lens and the radius (BOr) of the abutting portion of the barrel 11 by the relational expression of Equation 3: OU (calculated value)= 144.7037 mm.

Thus, the processing dimension of the outer 21b is as follows: OU=144.8000 mm.

Likewise, from the relational expression of Equation 2, the length (LO) of the rod 22b is as follows: LO (calculated value)=154.7037 mm. Thus, the processing dimension of the rod 22b is as follows: LO=154.8000 mm.

The behaviors of the holding apparatus having the above structure under the conditions that (A) an ambient temperature increases by 10° C. from 20° C. to 30° C. and (B) an ambient temperature decreases by 10° C. from 20° C. to 10° C.

<(A) 10° C. Increase in Temperature from 20° C. to 30° C.>

The radius (Lr) of the lens 1b at a temperature of 30° C. is calculated as follows:

$$Lr(30° C.)=Lr(20° C.)\times(1+(\alpha_L\times10° C.))=400\times(1+(0.5\times10^{-6}\times10))=400.0020 \text{ mm} \quad (E)$$

Br(30° C.), a length corresponding to the distance from the center of the lens 1b to the position of the tip of the rod 22 being touched on the periphery of the lens 1b, is derived from the dimensions of the outer 21b and the rod 22b and represented as follows:

$$Br(30° C.)=BOr(30° C.)+OU(30° C.)-LO(30° C.)$$

First, the radius (BOr) of the outer-abutting portion of the barrel 11b (30° C.) is expressed as follows:

$$BOr(30° C.)=Br(20° C.)\times(1+(\alpha_B\times10° C.))=410\times(1+(10.7\times10^{-6}\times10))=410.0439 \text{ mm}.$$

A distance OU (30° C.) from the portion of the outer 21b, which is fixed on the barrel 11b, to the tip of the rod 22b, which is distant from the light axis of the lens 1b, is expressed as follows:

$$OU(30° C.)=OU(20° C.)\times(1+(\alpha_{OU}\times10° C.))=144.8000\times(1+(1.0\times10^{-6}\times10))=144.8015 \text{ mm}.$$

The length LO of the rod 22b (30° C.) is expressed as:

$$LO(30° C.)=LO(20° C.)\times(1+(\alpha_{LO}\times10° C.))=154.8000\times(1+(28.0\times10^{-6}\times10))=154.8434 \text{ mm}$$

Br(30° C.), a length corresponding to the distance from the center of the lens 1b to the position of the tip of the rod 22b being touched on the periphery of the lens 1b, is expressed as:

$$Br(30°\text{ C.})=BOr(30°\text{ C.})+OU(30°\text{ C.})-LO(30°\text{ C.})=410.0439+144.8015-154.8434=400.0020 \text{ mm} \quad (F)$$

Therefore, an expansion error between the radius (E) of the lens 1b and the radius (F) of the rod 22b with a 10° C. increase in the ambient temperature is substantially zero (0) mm. The degrees of lens decentering and lens stress are sufficiently small and the influences thereof are ignorable.

<(B) 10° C. Decrease from 20° C. to 10° C.>

The behaviors of the aforementioned holding apparatus when the ambient temperature of the telescope decreases will be described.

The radius (Lr) of the lens 1b at a temperature of 0° C., when the temperature decreases by 10° C. from 20° C. to 10° C., is calculated as follows:

$$Lr(10°\text{ C.})=Lr(20°\text{ C.})\times(1+(\alpha_L\times-10°\text{ C.}))=400\times(1+(0.5\times10^{-6}\times10))=399.9980 \text{ mm} \quad (G)$$

The radius (Br) of the outer-abutting portion of the barrel 11b (10° C.) is expressed as follows:

$$Br(10°\text{ C.})=Br(20°\text{ C.})\times(1+(\alpha_B\times-10°\text{ C.}))=410\times(1+(10.7\times10^{-6}\times-10))=409.9562 \text{ mm.}$$

A distance OU (10° C.) from the portion of the outer 21b, which is fixed on the barrel 11b, to the tip of the rod 22b, which is distant from the light axis of the lens 1b, is expressed as follows:

$$OU(10°\text{ C.})=OU(20°\text{ C.})\times(1+(\alpha_{OU}\times-10°\text{ C.}))=144.8000\times(1+(1.0\times10^{-6}\times10))=144.7986 \text{ mm}$$

The length LO of the rod 22b (10° C.) is expressed as:

$$LO(10°\text{ C.})=LO(20°\text{ C.})\times(1+(\alpha_{LO}\times10°\text{ C.}))=154.8000\times(1+(28.0\times10^{-6}\times10))=154.7567 \text{ mm}$$

Br (10° C.), a length corresponding to the radius of the tip of the rod 22b being touched on the periphery of the lens 1b, is expressed as:

$$Br(10°\text{ C.})=BOr(10°\text{ C.})+OU(10°\text{ C.})-LO(10°\text{ C.})=409.9562+144.7986-154.7567=399.9981 \text{ mm} \quad (H)$$

Therefore, a contraction error between the radius (G) of the lens 1b and the radius (H) of the rod 22b with a 10° C. decrease in the ambient temperature is 0.0001 mm, having extremely little effect on the optical performance of the lens 1b. Furthermore, the amount of contraction of the tip of the rod 22b is 0.0001 mm smaller than that of the lens 1b. Therefore, there is no stress caused on the lens 1b because the lens 1b is not tightened by the rods 22b even if a decrease in temperature occurs.

A housing apparatus according to a third embodiment (Embodiment 3) of the present invention will be described with reference to FIG. 8 to FIG. 11.

As shown in FIG. 7A, FIG. 7B, and FIG. 8, flat portions F are partially formed on the periphery of a lens 101. Here, FIG. 7A is a front view of the lens 101 where each of the portions F on the periphery thereof are formed in a flat shape. FIG. 7B is a side view of the lens 101 representing the periphery thereof with flat portions F. In other words, a plurality of flat portions (portions F) is formed on the lateral side of an optical element and, in the case of an example shown in FIG. 7, arranged at equal intervals of 15-degree pitches.

In FIG. 8, a flange portion 111a, which is formed in a flat shape, is arranged on part of the periphery of a barrel 111. An outer is then fixed on the flange portion 111a via an outer pad 120 and a pad guide 113. There are four screws 121C for fixing the outer 121 on the barrel 111. In addition, slot cuts 121a and 121b are formed in the periphery of the outer 121.

The tip of the outer 121, which is distal to the light axis of the lens 101, is provided with a cap 124 (also called a lid member) via ring-shaped spacer 123.

A rod 122 is fixed on the center of the cap 124 via screws 122a. The end of the rod 122, which is proximal to the lens 101, abuts against the surface of the pad 112, which is located on the opposite side from the light axis of the lens 101, via the spacer 123, the outer 121, the outer pad 120, the barrel 111, and the pad guide 113. Then, the cap 124 is fixed on the outer 121 by fastening the screws 124a through holes of the cap 124 and holes of the spacer 123. In this embodiment, the fixing members used for such fixing are not limited to such screws. Alternatively, any of other well-known fixing members that allow the cap to be detachable may be replaced with the screws.

The tip of the rod 122 is formed in a spherical convex shape and passes through the center hole of the pad guide 113 and presses against the pad 112. The pad 112 (also called a third member) abuts against the flat portion F on the periphery of the lens 101.

Consequently, the liner expansion coefficient of the lens 101 is smaller than that of the barrel 111, the outer 121 is made of a material with a high liner expansion coefficient, and the rod 122 is made of a material with a small linear expansion coefficient. If the ambient temperature of the holding apparatus constructed as described above is changed, the portion of the barrel 111 on which the outer 121 made of a material with a high linear expansion coefficient is attached tends to be deformed. Since the slot cuts 121a and 121b are formed in the outer 121, the stress of the deformation does not turn into strong power and is relieved. Furthermore, the outer pad 120 is placed between a fixing portion 111a of the barrel 111 and the outer 121. This outer pad 120 is prepared using a rigid material with a low linear extension (e.g., a super invar material). Therefore, the stress of the dimensional change due to a change in temperature caused in the outer 121 is blocked by the outer pad 120, so that it will be not transferred to the barrel 111. Therefore, the stress to be caused by deformation of the outer is hardly transmitted to the barrel 111, so that the position where the lens 101 is held will be not changed and high image quality can be preserved.

The pad 112 abutted against the periphery of the lens has a wide abutting area, so that a load imposed on the lens 101 can be relieved and a stress imposed on part of the lens 101 can be reduced, leading to a reduction in deformation.

Furthermore, these members that support the lens are performed using screws which are tightened in the radial direction of the lens 101. Thus, the alignment of the lens 101 can be adjusted by turning the lens 101 around the light axis thereof after incorporating the lens 101 into the barrel 111. For example, if the screws 124a are removed, the rod 122 that supports the lens 101 toward the center thereof can be removed. Thus, if there is a sufficient difference between the inner diameter of the barrel 111 and the outer diameter of the lens 101, then the lens 101 can rotate.

Figure 9:
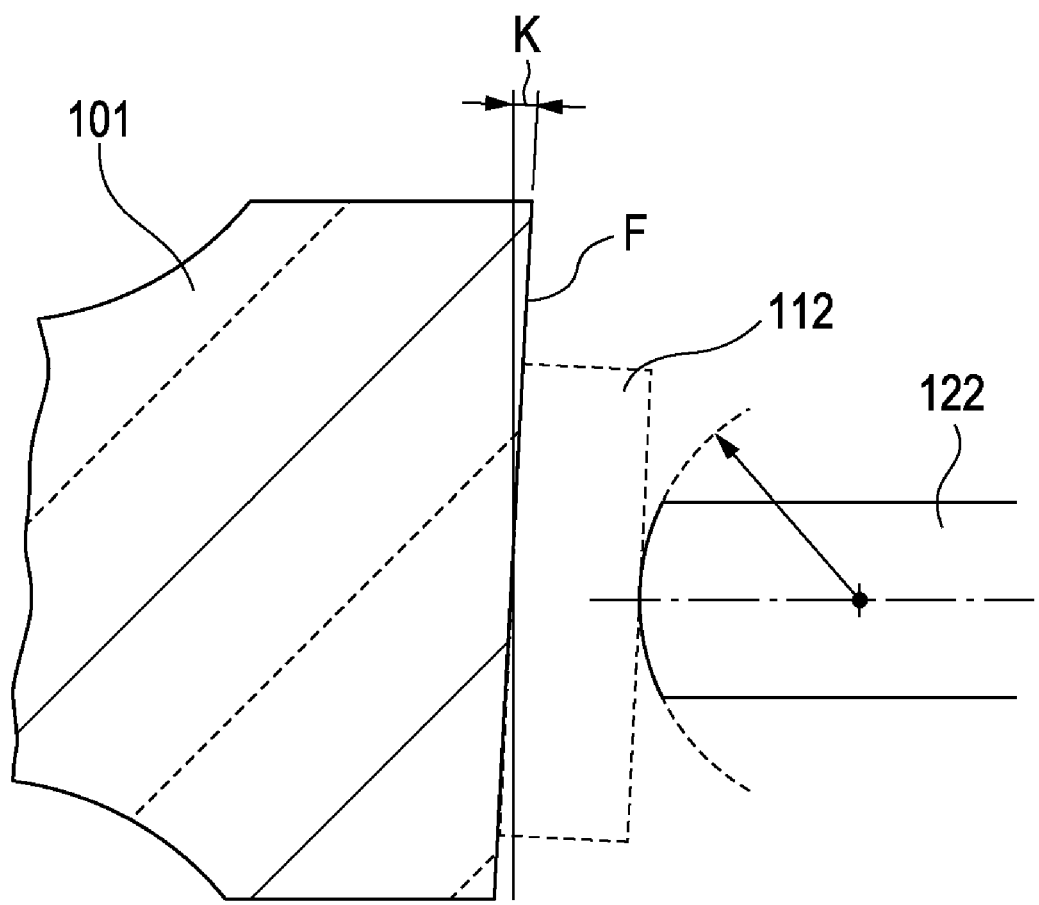
FIG. 9 is an explanatory diagram of the tip of a rod.

FIG. 9 illustrates the tip of the rod. In FIG. 9, part of the lens 101 is illustrated and the flat portion on the periphery of the lens 101 is represented by alphabetic letter "F". The flat portion F of the lens 101 may be formed with a small deviation from a plane parallel to the light axis thereof when the flat portion F is additionally formed. Thus the resulting flat portion F is out of parallel with the light axis of the lens 101 and inclined. Thus, as represented by alphabetic letter "M" in FIG. 9, the pad 112 is also inclined along the inclined flat portion F of the lens 101. If the tip of the rod 122 is formed in a flat shape but a spherical convex shape, a load may be only applied to an area near the edge line of the periphery of the rod

122. Although a material with a high Young's modulus is used, there is a possibility of deforming or damaging the edge line of the tip of the rod 122. In the case that the tip of the rod 122 is formed in a spherical convex shape, the hemispherical portion of the rod 122 in contact with the pad 112 has a larger contact area than the flat tip of the rod 122 when being inclined. Therefore, the stress of the contact portion can be reduced. Thus, the contact portion will be hardly broken under a load.

Figure 10A:
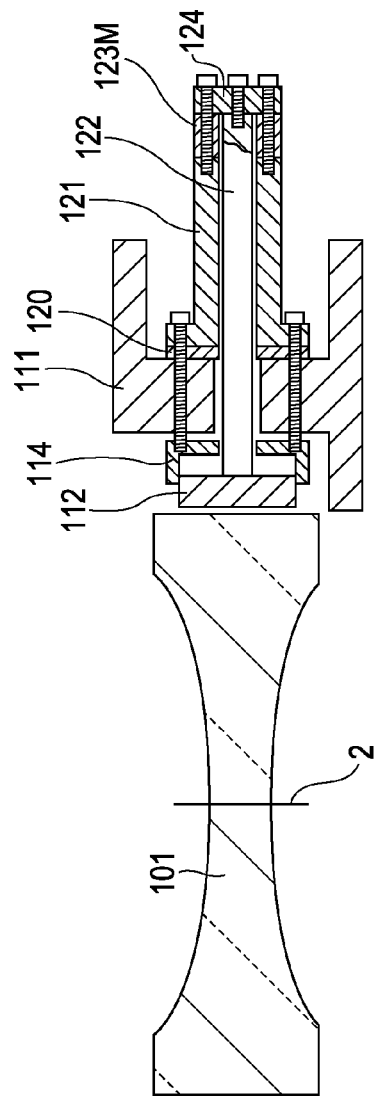
FIG. 10 is an explanatory diagram of the third embodiment.
Figure 10B:
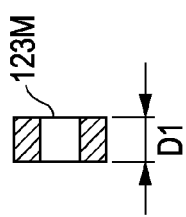
Figure 11A:
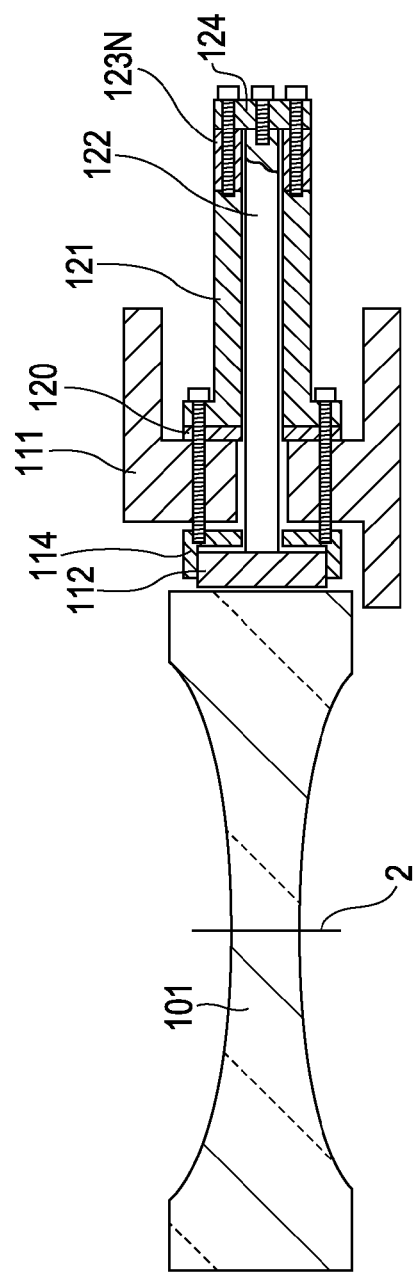
FIG. 11 is an explanatory diagram of the third embodiment.
Figure 11B:
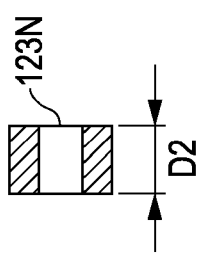

Referring now to FIG. 10 and FIG. 11, an example of the spacer 123 will be described. FIG. 10 and FIG. 11 are cross-sectional diagrams that illustrate the structure of the spacer 123 shown in FIG. 8. The end of the rod 122, which is proximal to the light axis of the lens 101, can be arranged on a suitable position with respect to the radius of the lens 101 by selecting an appropriate thickness of the spacer 123. FIG. 10A is a schematic cross-sectional view of the holding apparatus with a spacer 123M and FIG. 10B is the cross-sectional view of the spacer 123M with a predetermined thickness D1. FIG. 11A is a schematic cross-sectional view of the holding apparatus with a spacer 123N and FIG. 11B is the cross-sectional view of the spacer 123N with a predetermined thickness D2 (>D1). In other words, the spacer 123N shown in FIG. 11 is larger thickness than the spacer 123M shown in FIG. 10 to respond to a lens with a larger diameter. Exchange of spacers is performed by removing a detachable cap 124 from the end of the outer 121.

Thus, such configurations of the spacer and the holding apparatus make it possible to perform the parallel decentration adjustment of the lens. If an appropriate thickness of the spacer 123 fixed on the tip of each outer 121 is selected, the center of the lens can be adjusted to an appropriate position with respect to the position (axis) of the barrel.

Figure 12:
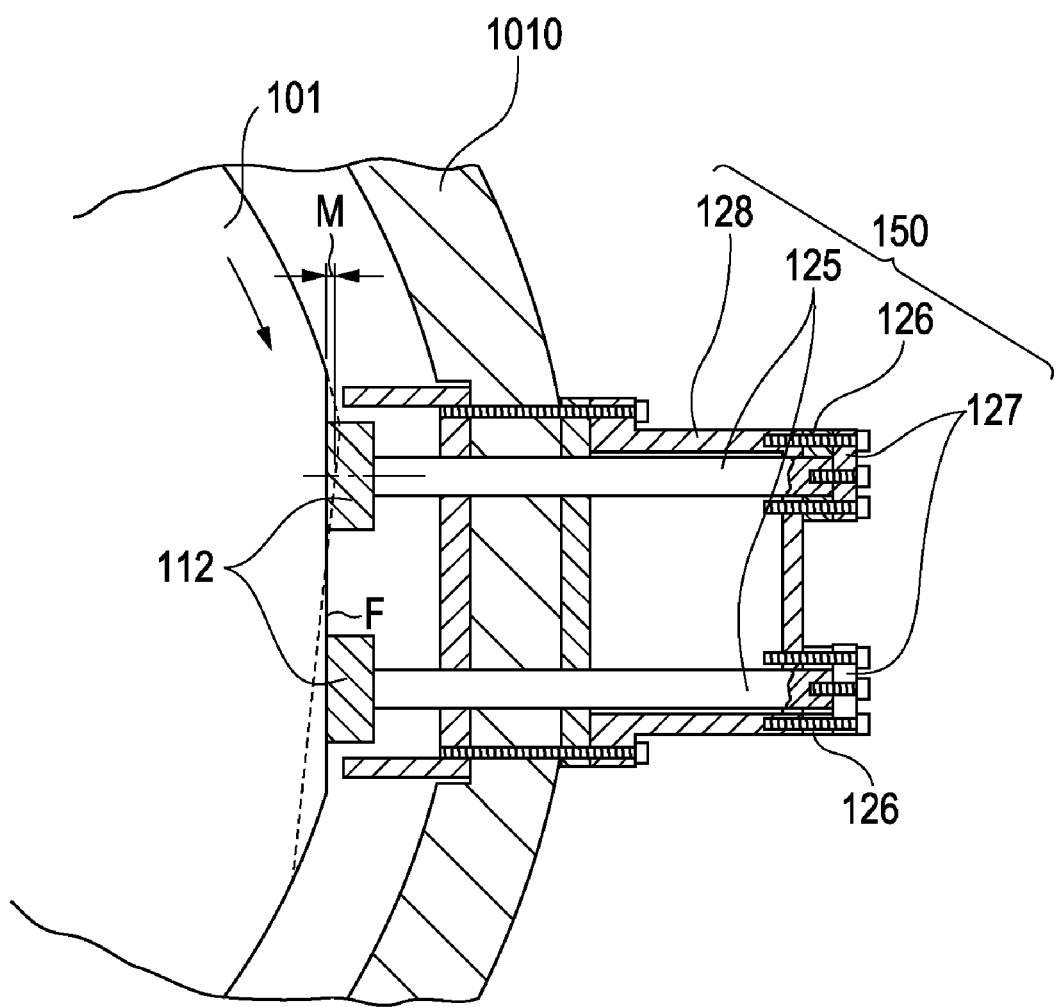
FIG. 12 is an explanatory diagram of a fourth embodiment.

Referring now to FIG. 12, a holding apparatus according to a forth embodiment (Embodiment 4) of the present invention will be described.

Figure 13:
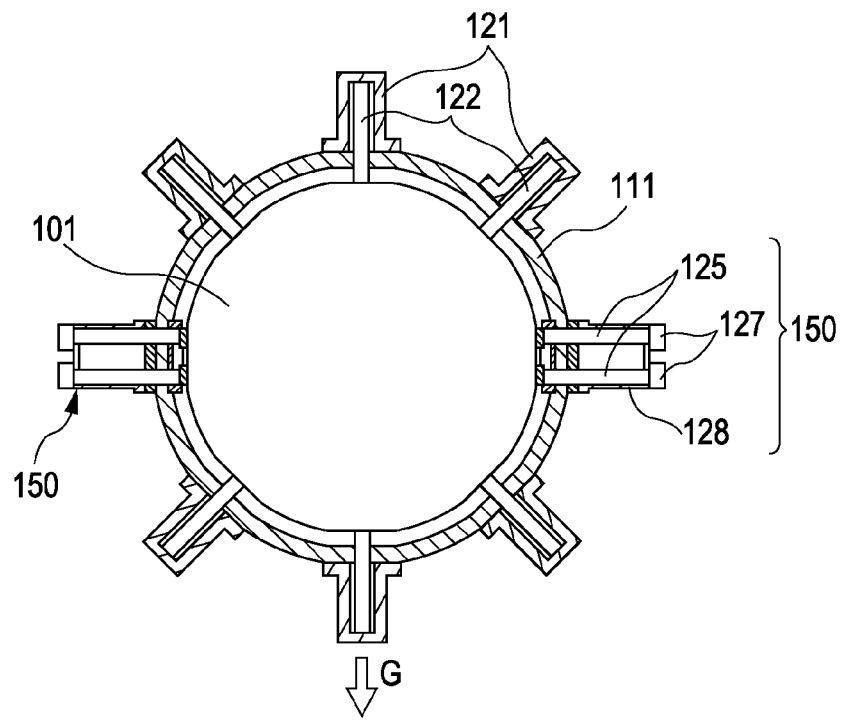
FIG. 13 is an explanatory diagram of the fourth embodiment.

In this embodiment, two holes through which their respective rods 125 pass in parallel are formed in proximity to each other in the periphery of the barrel 1010. In this embodiment, there are two pads 112, two rods 125, two spacers 126, and two caps 127, each of which is the same member as one shown in FIG. 8. However, it is noted that an outer 128 is designed to hold two rods 125. FIG. 13 is a schematic cross-sectional diagram illustrating the arrangement of a set of outer assemblies 150 each including these pads 112, rods 125, spacers 126, and caps 127 in addition to the outer 128.

Arrow G in the lower part of FIG. 13 indicates the direction of gravity imposed on the telescope when observing an astronomic object near the horizon. The direction of gravity imposed on the telescope when observing an astronomical object near the horizon. The outer assemblies 150 are arranged so that they face each other in the direction perpendicular to the direction of gravity (in this figure, on the left and right sides) to sandwich the lens 101 from the left and right sides thereof, thereby preventing the lens from being displaced. In other words, the outer assemblies 150 in combination with the lens with flat portion on the periphery thereof as shown in FIG. 7 allow the lens to be prevented from being displaced in the barrel.

Here, an advantage of preventing the displacement of the lens 101 will be described. The lens 101 has a symmetrical shape with respect to the light axis thereof, but strictly having some manufacturing errors. If an improvement in performance of the telescopic is desired, the manufacturing errors must be less than usual. However, there is a limit in making the manufacture errors small. For this reason, in consideration of manufacturing errors of other optical elements, there is a case in which the attitude of the lens 101 is adjusted by turning the lens 101 around the light axis thereof and the lens 101 is then fixed on the adjusted attitude to provide the entire optical system with high performance. After the adjustment, if the lens 101 rotates, the performance of the entire optical system may be slightly decreased. Thus, it is preferable to prevent the lens 101 from rotating. If the lens 101 is imparted with a rotational force due to oscillation or the like caused by changing the posture of the telescope, or the like, the angle of the flat portion F on the periphery of the lens 101 with respect to the tip of the rod 122 may be changed, for example, as represented by "M" in FIG. 12. In this case, since the pad on the tip of one of the rods 122 imparts an abutting load to the flat portion F, the rotation of the lens 101 can be prevented. Therefore, the high performance of the optical system can be maintained for a long period of time.

Figure 14:
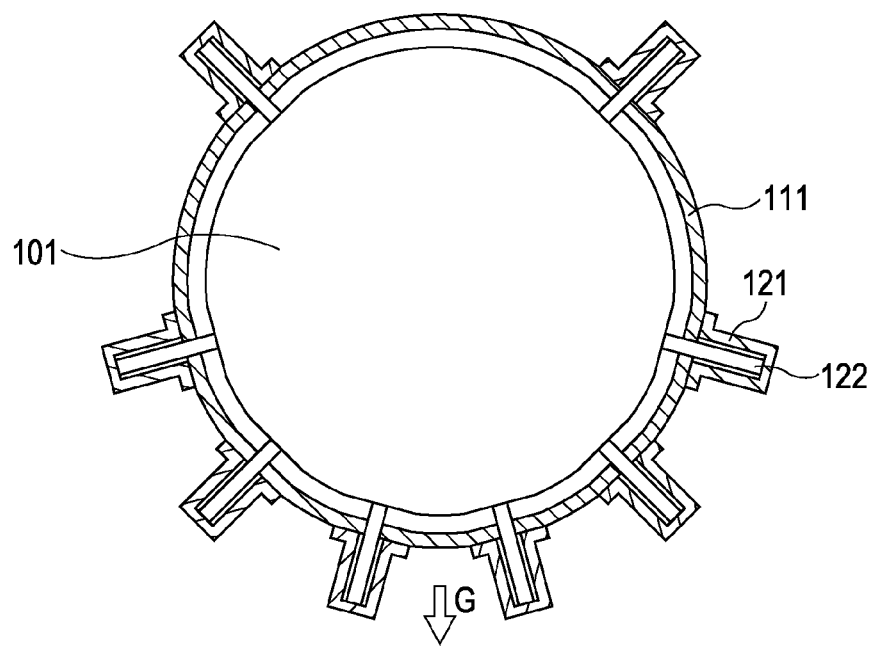
FIG. 14 is an explanatory diagram of the arrangement of a fifth embodiment.

Referring now to FIG. 14, a holding apparatus according to a fifth embodiment (Embodiment 5) of the present invention will be described.

In this embodiment, an unit including the outers 121 and the rods 122, which are described above, is referred to as an "outer assembly 100". Arrow G in FIG. 14 represents the direction of gravity. In this embodiment, none of outer assemblies 100 is located directly under the barrel 111. The outer assemblies 100 are arranged in a bilaterally-symmetric manner on the periphery of the barrel 111. In other words, a plurality of outer assemblies (combinations of first and second members) are symmetrically arranged with respect to a plane that includes the direction of gravity and the direction of the axis of the barrel included from the direction of gravy. Then, there is no outer assemblies arranged on the plane.

In this way, a stress imposed on the lens 101 can be reduced, compared with one caused by arranging an outer assembly directly under the barrel 111. In addition, the number of outer assemblies on the upper part of the barrel 111, where the gravity is not imparted, may be smaller than that on the lower part thereof. Such an arrangement of the outer assemblies at unequal angular intervals allows the optical system to be reduced in weight.

Figure 15:
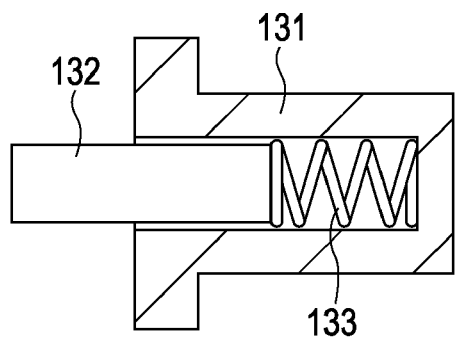
FIG. 15 is an explanatory diagram of a sixth embodiment.
Figure 16:
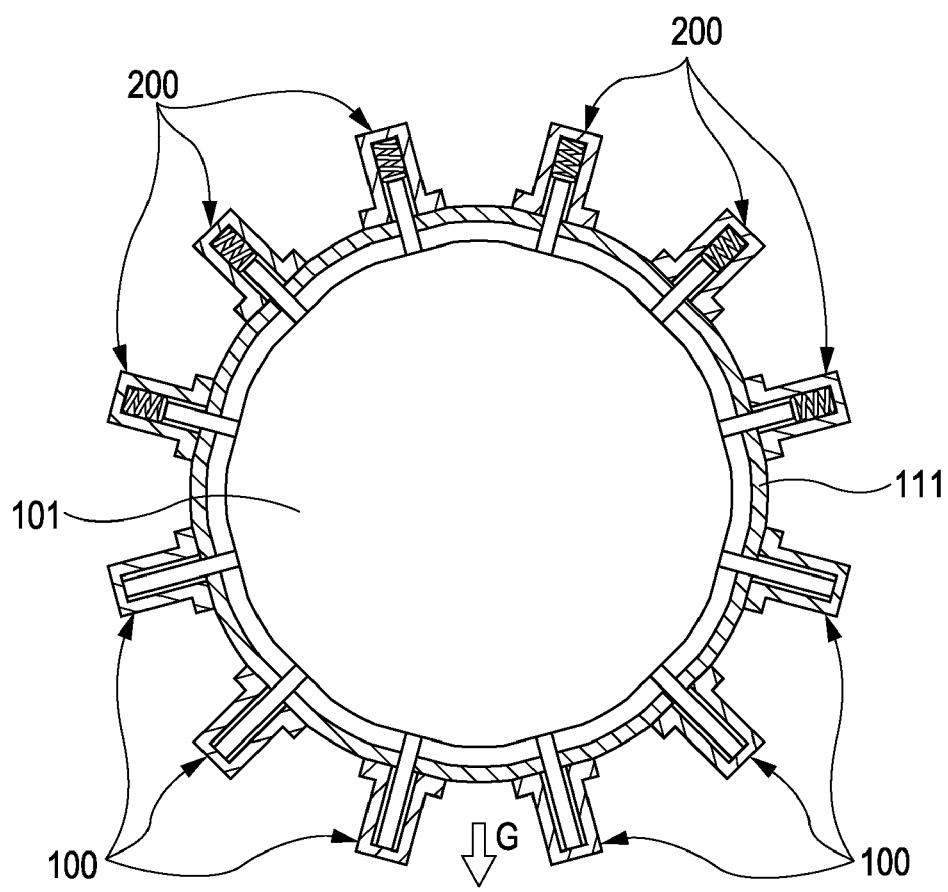
FIG. 16 is an explanatory diagram of the sixth embodiment.

Referring now to FIG. 15 and FIG. 16, a holding apparatus according to a sixth embodiment (Embodiment 6) will be described.

In this embodiment, as shown in FIG. 15, a spring (elastic member) 133 is arranged in the inside of an outer 131. The spring 133 is contracted when being pushed, but it acts to push back and extend. Thus, the spring 133 is designed to push a short rod 132 in the outer 131. A unit constructed of the outer 131, the spring 133, and the short rod 132 is referred to as a spring assembly 200. A plurality of spring assemblies 200 configured as described above may be arranged as shown in FIG. 16.

In FIG. 16, the lower part of the barrel 111, on which the gravity tends to impose, is provided with the same outer assemblies 100 as those illustrated in FIG. 14. On the other hand, the upper part of the barrel, which is opposite to the lower part thereof, is provided with the spring assemblies 200 illustrated in FIG. 15.

The configuration of the holding apparatus of the present embodiment will exert advantageous effects as described below. For example, when the telescope or the optical system as a part of the telescope is transported for the placement thereof, vibrations may occur and forces may be imposed from the barrel to the lens via the rod and the outer. As a result, there is a possibility that the lens may be damaged. Thus, the spring assembly 200 of the present embodiment is advantageous to reduce such a possibility.

Therefore, the lens is not decentered and a high image quality can be attained, because, in the telescope placed on a mount after transportation, the lens abuts against the outer assembly 100 arranged on the lower part of the barrel and centered on the barrel.

Figure 17:
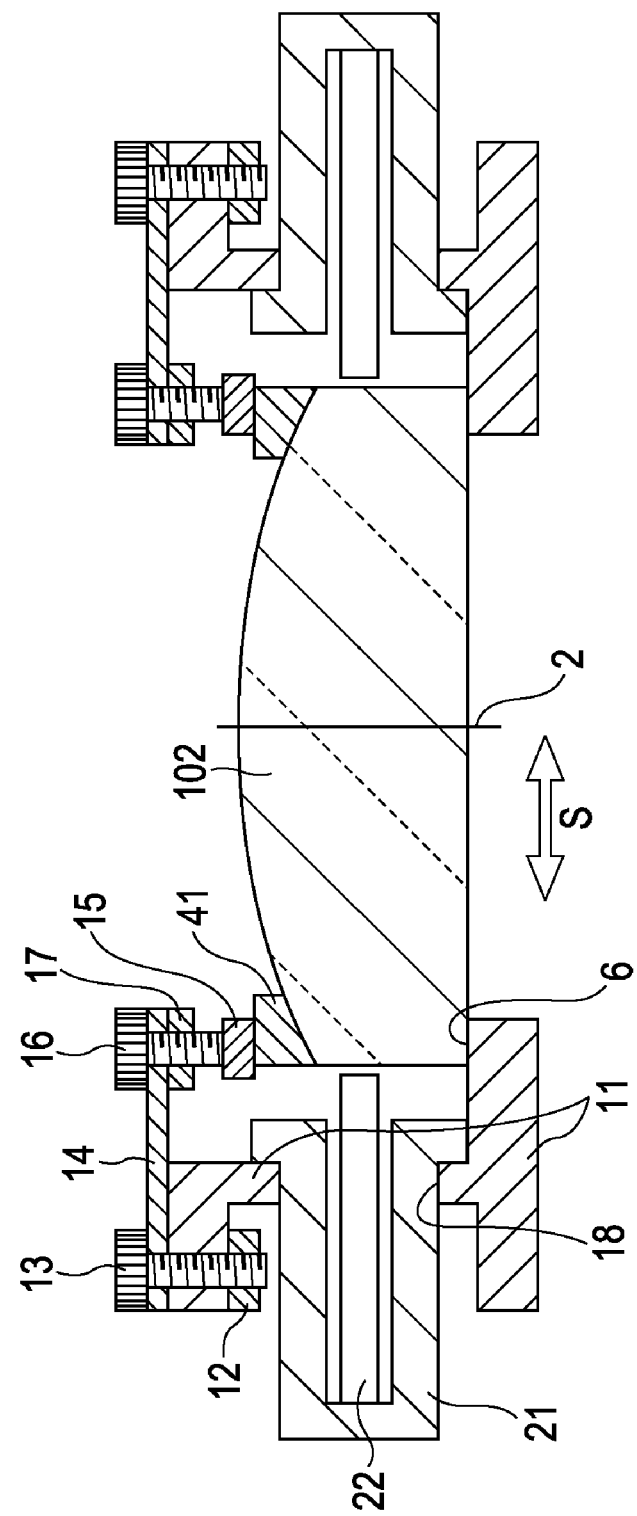
FIG. 17 is an explanatory diagram of a seventh embodiment.

Referring now to FIG. 17, a lens assembly according to a seventh embodiment (Embodiment 7) of the present invention will be described.

In this embodiment, a planoconvex lens with a flat under surface is installed in a barrel. The outer portion of the upper surface of the lens, which is adjacent to the periphery thereof, is pressed by a lens-pressing pad 15 via a convex lens retaining pad 41.

Figure 18:
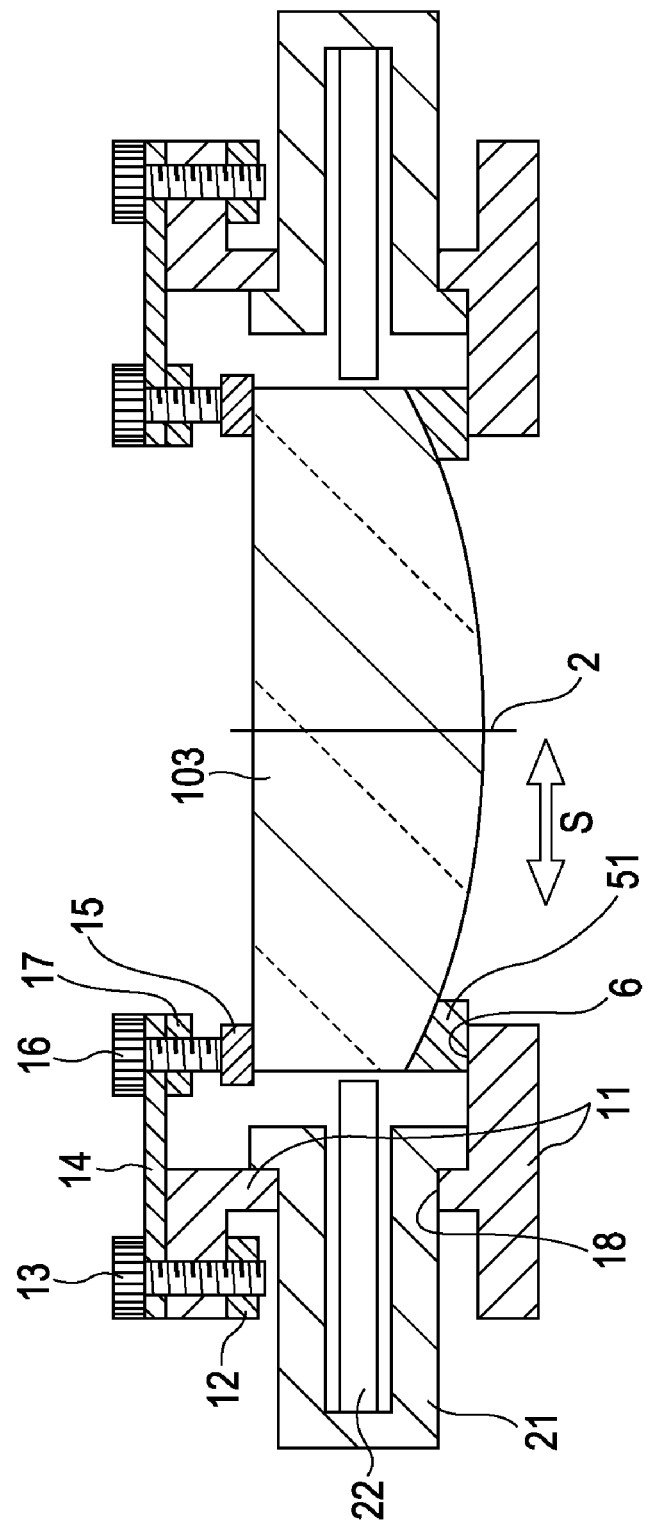
FIG. 18 is an explanatory diagram of an eight embodiment.

Referring now to FIG. 18, a holding apparatus according to an eighth embodiment (Embodiment 8) will be described.

In this embodiment, a planoconvex lens with a under convex surface is installed in a barrel. A convex lens retaining pad 51 is arranged between the under convex surface of a lens 103 and a barrel 11.

Figure 19:
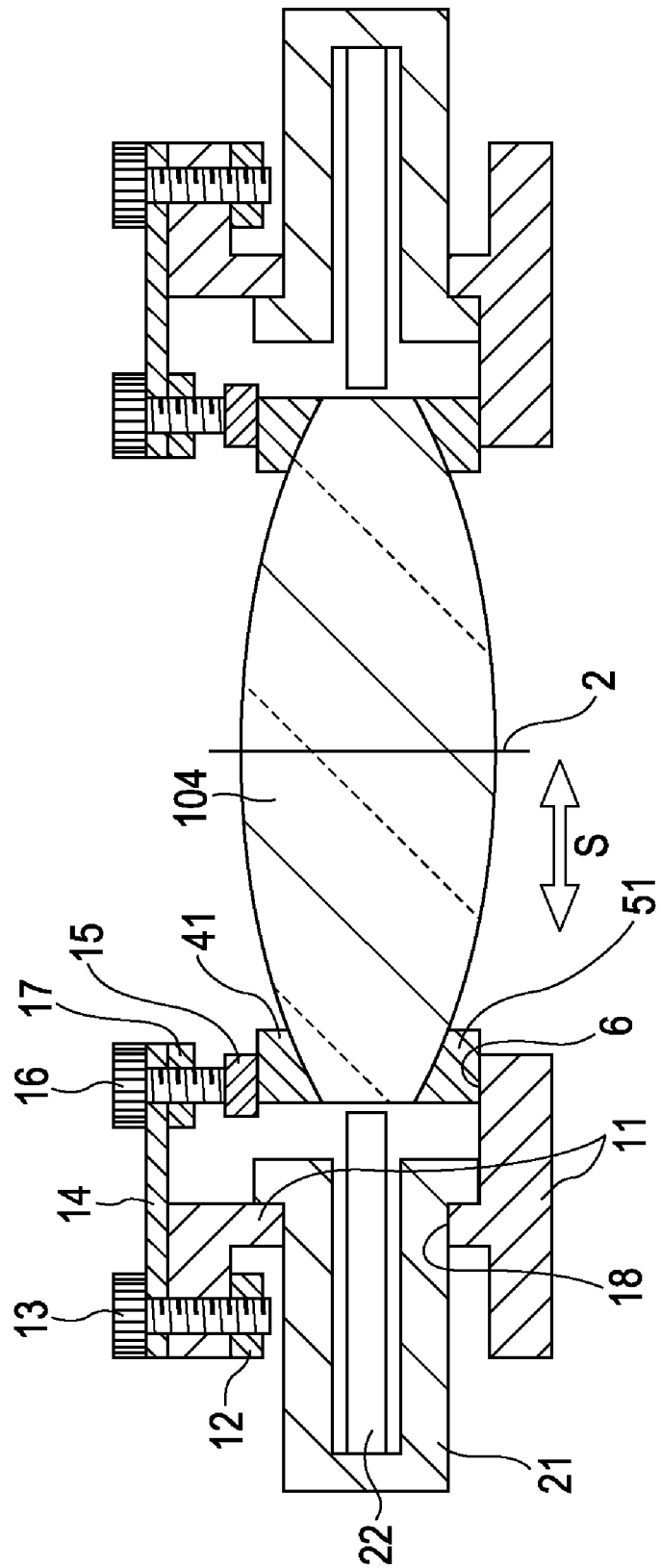
FIG. 19 is an explanatory diagram of a ninth embodiment.

Referring now to FIG. 19, a lens assembly according to a ninth embodiment (Embodiment 9) of the present invention will be described.

In this embodiment, a biconvex lens with upper and under convex surfaces is installed in a barrel. The same convex lens retaining pad 41 as one used in Embodiment 7 is arranged on the upper convex surface. The same convex lens retaining pad 51 as one used in Embodiment 7 is arranged on the under convex surface.

Alternatively, a flat optical element with flat upper and under surfaces may be incorporated in the barrel. In this case, it is not necessary to arrange anything between the flat optical element and the pat or the barrel.

A large frictional force may be caused between the flat glass and the lens or the barrel or between the lens and the lens-pressing pad. Thus, a large force to move the lens in the direction along the arrow S shown in the lower part of the figure may be required. In this case, Teflon (registered trademark) coating may be applied to the surface of the convex lens retaining pad 41 or the surface of the convex lens retaining pad 51. The application of Teflon may reduce the frictional force and allow the lens or the barrel to smoothly expand or contract in the diameter direction thereof due to variations in temperature. In the case of a high friction coefficient between the optical element and the barrel or the lens-pressing pad, even if the lens or the barrel may be difficult to smoothly expand or contract, the same effects as those of the above case can be obtained by subjecting the optical element, the barrel, and the lens-pressing pad to a process of lowering the friction coefficient, such as Teflon (registered trademark) coating.

Figure 20:
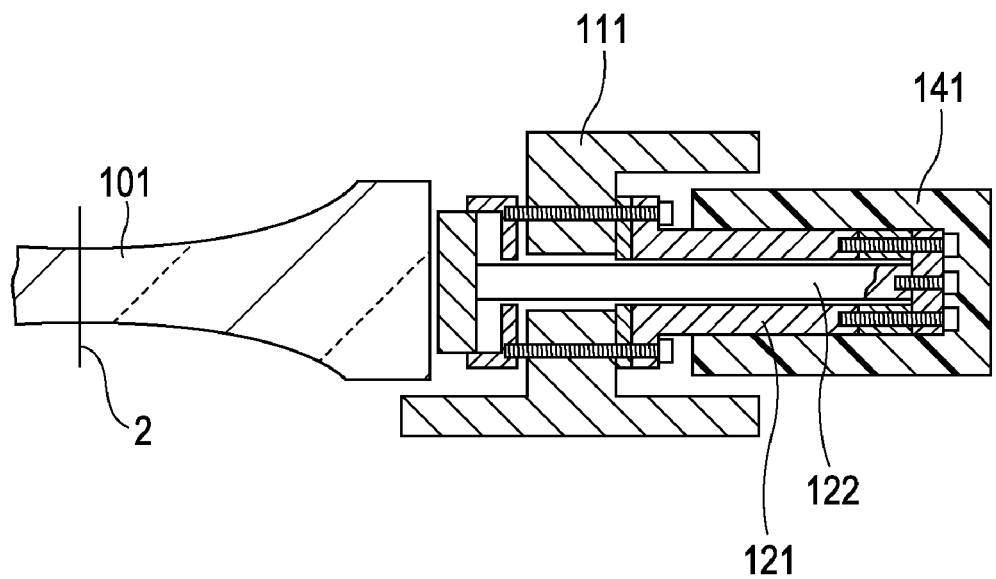
FIG. 20 is an explanatory diagram of a tenth embodiment.

Referring now to FIG. 20, a holding apparatus according to a tenth embodiment (Embodiment 10) of the present invention will be described.

In this embodiment, an insulating member is arranged on the periphery of the outer assembly 100 illustrated in FIG. 10 or FIG. 14. The insulating member 141 may be a material with a large amount of minute air bubbles in a sold. For example, foaming resin such as polystyrene foam is preferable because of its lightweight and cheapness.

A telescope is influenced by outside air temperature which is greatly influenced by opening and closing of the dome of a building or wind velocity of the open air, so that a temperature change will advance from the outside of the telescope to the inner side thereof gradually. If the dome of the building is opened to subject the telescope to the open air at 10° C. from a state in which the temperature of the entire telescope is 20° C. in the building, the telescope is quickly cooled toward 10° C.

Figure 22:
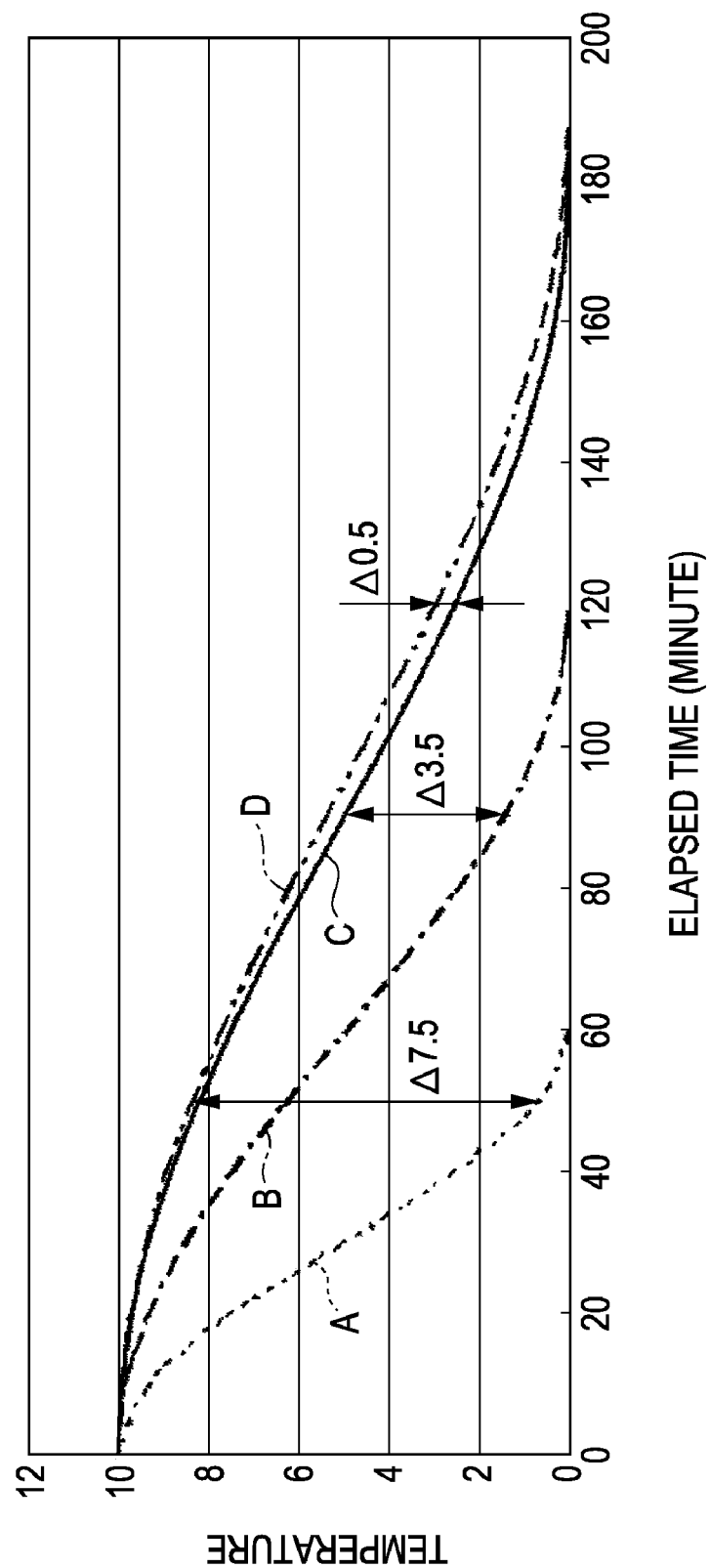
FIG. 22 is an explanatory diagram of effects the tenth and eleventh embodiments.

FIG. 22 is a graphical representation of such a state. In the graph, the vertical axis represents temperatures and the horizontal axis represents elapsed times. The temperature of the outer assembly is indicated by "A" and the temperature of the lens in the barrel is indicated by "C". The lens becomes the same temperature as ambient temperature within a time of approximately 180 minutes. In addition, the outer assembly becomes the same temperature as ambient temperature within a time of approximately 60 minutes. A temperature difference between the lens and the outer assembly becomes 7.5° C. at a time of approximately 50 minutes.

Like Embodiment 1, when the linear expansion coefficients of the lens 101 and the outer 121 are high while the linear expansion coefficients of the barrel 111 and the rod 122 are low, the outer assembly 100 located on the outer side of the barrel 111 becomes cooled down faster than the lens located on the inner side of the telescope. Therefore, if the radius (Br) of the tip of the rod becomes smaller than the radius (Lr) of the lens, the tip of the rod pushes against the periphery of the lens. As a result, a stress may be imposed on the lens and the surface profile of the lens may be changed, thereby causing a decrease in performance.

The temperature of the outer assembly is indicated by "B" in FIG. 22 when the insulating member is arranged to reduce a temperature difference between the lens and the outer. In this case, the temperature difference is reached at the maximum, 3.5° C., at an elapsed time of 90 minutes. In this way, the temperature difference can be reduced. Thus, the pressure of the tip of the rod in the outer assembly against the periphery of the lens can be relieved.

Both the temperature of the lens 101 and the temperature of the outer assembly 100 becomes the same as that of the open air with time, and a high image quality (optical performance) can be continuously maintained.

If the lens assembly is subjected from a 20° C. environment to a higher temperature, a high image quality can be continuously maintained by the effects of an insulating material that reduces a temperature difference between the lens and the outer assembly.

Figure 21:
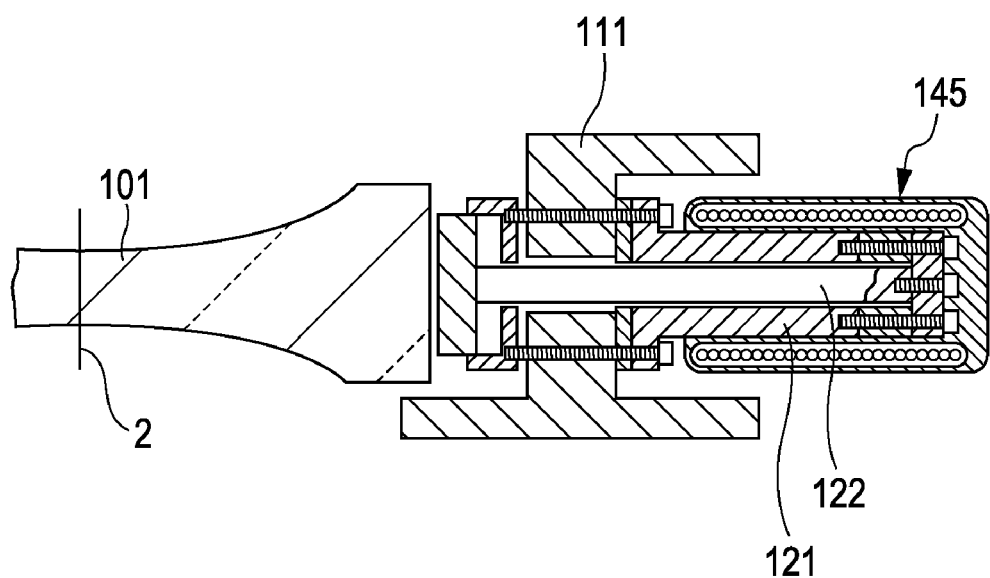
FIG. 21 is an explanatory diagram of an eleventh embodiment.

Referring now to FIG. 21, a holding assembly according to an eleventh embodiment (Embodiment 11) will be described.

In the present embodiment, just as in the case of Embodiment 10, it is designed to be hardly influenced by a change in temperature of the open air. In other words, a heater is arranged around the outer. The heater may be prepared by providing a heater wire such as a nichrome wire with a flame-retardant coating to make a fabric-like material and then wrapping the fabric-like material around the outer assembly. If voltage is applied to both ends of the heater wire, the temperature of the heater increases and heat generated therefrom is then transmitted to the outer assembly, causing an increase in temperature of the outer assembly. As a result, a temperature difference between the outer assembly and the lens can be reduced and the tip of the rod can be prevented from pushing against the periphery of the lens which is not yet cooled.

Temperature sensors (e.g., thermocouples) may be placed near the outer assembly and the lens, respectively. Then, an electric current passing through the heater is controlled to make the temperature of the lens coincide with the temperature of the outer. Therefore, in comparison with the configuration of the lens assembly of Example 10, the performance variation can be prevented even if a larger temperature change is occurred. This advantageous effect is shown in FIG. 22. In this embodiment, the temperature of the outer assembly is indicated by "D". The outer assembly may be controlled to be cooled more slowly than the lens that shows a slow change in temperature. Therefore, even if the temperature of the open air around the telescope falls rapidly, a pressure against the lens caused by rapid cooling of the outer assembly can be reduced. In other words, such a configuration of the lens assembly is more preferable to maintain a high image quality against a change in temperature of the open air.

Figure 23:
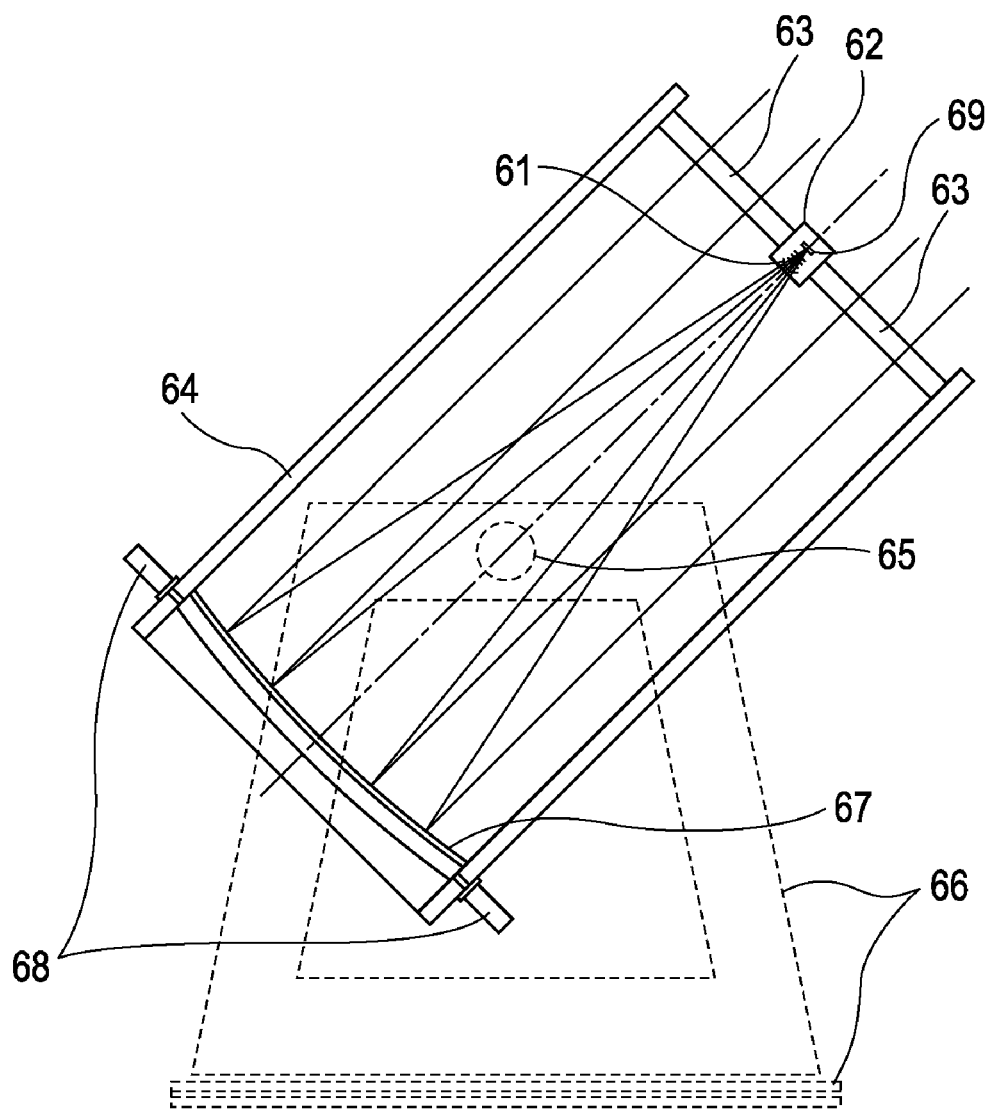
FIG. 23 is an explanatory diagram of a twelfth embodiment.

Referring now to FIG. 23, an exemplary large-aperture reflecting telescope according to a twelfth embodiment (Embodiment 12) of the present invention will be described.

The telescope is supported by a mount 66 having a function of changing the attitude of the telescope toward an astronomical object to be observed. The mount 66 supports a housing 64 via a joint 65. A parabolic mirror 67, which is provided as a main reflecting mirror, is arranged on the bottom of the housing 64. In this figure, a barrel 62 of a camera unit fixed on a frame 63 is arranged on the upper right of the housing 64.

A light flux entered into the housing 64 from an astronomical object located on the upper right side of the figure passes the frame 63 and is then reflected on a main reflecting mirror 67. The light flux reflected on the main reflecting mirror (parabolic mirror) 67 goes to a focus point on the parabolic mirror and a camera unit for forming an image with high image quality onto a solid-state imaging device 69 is arranged near the focus point.

The camera unit is provided with a lens system 61, for example, an anastigmatic lens system as disclosed in Japanese Patent Laid-Open No. 06-230274. A holding apparatus for holding an optical element according to any embodiment of the present invention will exert advantageous effects like those of the aforementioned embodiments even if the holding apparatus uses such an anastigmatic lens system.

In this embodiment, an outer assembly 68 having the same functions as those of the outer assembly 100 is arranged on a housing 64 that supports a main mirror 67. In this case, needless to say, advantageous effects like those of the aforementioned embodiments can be exerted.

Figure 24:
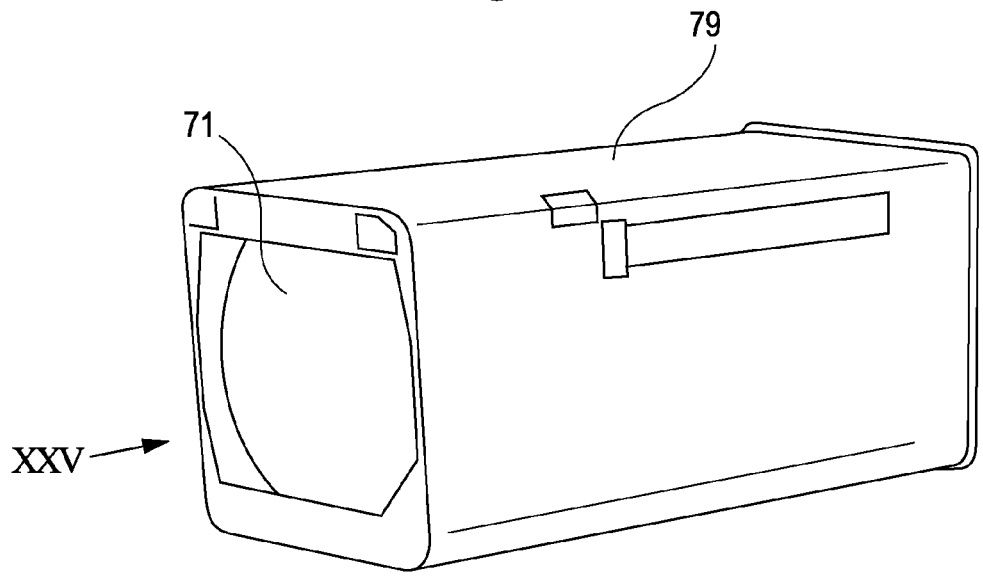
FIG. 24 is an explanatory diagram of a thirteenth embodiment.
Figure 25:
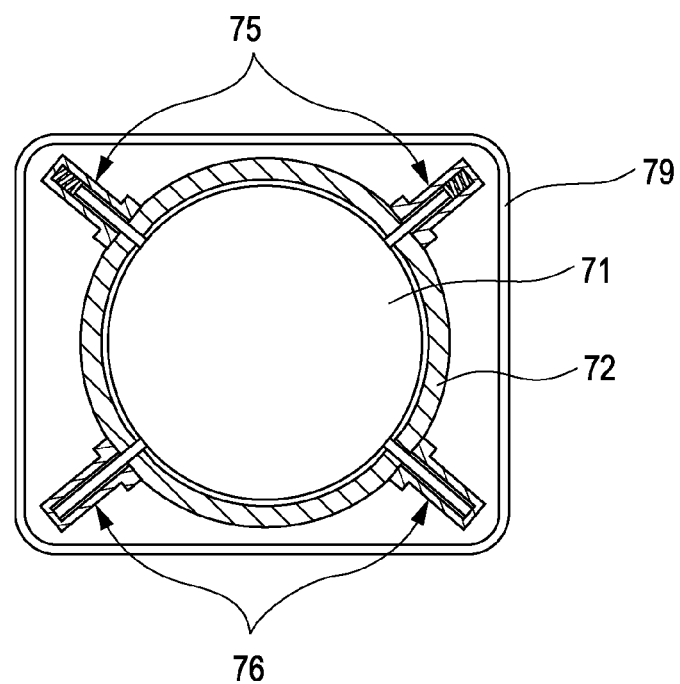
FIG. 25 is an explanatory diagram of the thirteenth embodiment.

Referring now to FIG. 24 and FIG. 25, a zoom lens for television camera according to a thirteenth embodiment (Embodiment 13) of the present invention will be described.

In these figures, a zoom lens 71 for television camera is illustrated. This zoom lens 71 may be one to be used in the outdoors, such as a stadium, as described in Japanese Patent Laid-Open No. 2001-183584. In the outdoors in summer, some of days will be extremely hot days with temperatures of 40° C. and more by sunlight irradiation. In addition, in the outdoors in winter, some of days will be extremely cold days with temperatures of 0° C. and less. Furthermore, the specifications of a lens described in Japanese Patent Laid-Open No. 2001-183584 include a focal distance of 660 mm and an F value of 3.3. It means that the zoom lens has a pupil diameter of 200 mm, which is significantly larger than the diameter of a general photographic camera lens.

FIG. 24 is an external view of a lens unit where such a zoom lens is incorporated. FIG. 25 is a front view of the lens unit shown in FIG. 24, which is viewed in the direction of arrow "XXV". A lens unit includes a cover 79, a barrel 72, and a lens 71. A lens-holding ring that keeps the lens in place is incorporated in an actual commercial product, but not shown in the figure for ease of explanation.

Under the lens 71, there are two outer assemblies 76 having the same configuration and functions as those illustrated in FIG. 8 to support the lens 71. On the other hand, spring assemblies 75 are arranged above the lens 71 to support the lens 71 from the upper side thereof. The spring assemblies 75 also have the same configuration and functions as those illustrated in FIG. 15. Both the outer set 76 and the spring set 75 are supported by a cylindrical barrel 72 and substantially arranged on the diagonal corners of a cover 71 in the form of a square box. In this way, as described with reference to FIG. 16, the TV-camera zoom lens according to the embodiment of the present invention does not cause the decentering of the lens due to variations in temperature while exerting an effect of maintaining a high image quality (high optical performance).

Although the embodiments of the present invention have been described by way of example in connection with a lens and a curved surface mirror. In addition, the present invention is also applicable to other optical devices, such as a filter and a flat mirror, to achieve the same advantageous effects as described above. Furthermore, it will be appreciated that the present invention is applicable to any device for holding any of other optical devices, such as a photographic super telephoto lens with a large aperture. Furthermore, the shape of any optical device to be hold is not limited to one with rotational symmetry with respect to the light axis of a lens.

Hereinafter, the design example of the lens-holding apparatus will be described.

1. In order to absorb a difference in dimensional change in the radial direction caused by a difference between the linear expansion coefficient of the lens and the linear expansion coefficient of the barrel, cup-shaped outers fixed on the barrel and rods are used. The rod is arranged so that the bottom of the outer is brought into contact with the periphery of the lens. The materials (linear expansion coefficients) and lengths of the outers and the rods are optimized, respectively.
2. When using a barrel made of a ceramic material with a linear expansion coefficient smaller than that of the lens, an outer is prepared using a material with a high linear expansion coefficient and a rod is prepared using a material with a low linear expansion coefficient.
3. When preparing the barrel using a metallic material with a linear expansion coefficient higher than that of the lens, the outer is prepared using a material with a low linear expansion coefficient and the rod is prepared using a material with a high linear expansion coefficient.
4. Each of the barrel, the outer, and the rod is prepared using a material with a Young's modulus of 30 GPa or more (e.g., a metallic or ceramic material).

According to the above design example, the following effects will be obtained:

1. It is possible to reduce a gap or a change in stress caused by a difference between linear expansion coefficients of the materials of the lens and the barrel. Thus, good optical performance can be maintained.
2. If the barrel is prepared using, for example, cordierite (Young's modulus: 140 [Gpa], specific gravity: 2.6 [g/cm$^3$]), the weight of the barrel can be reduced by approximately 50%, compared with the weight of a barrel prepared using a titanium material (Young's modulus: 107 [Gpa], specific gravity: 4.5 [g/cm$^3$]). The more the diameter of the barrel increases, the more the difference between the weights of these barrels.
3. A structural member for holding a lens does not use a soft material (low Young's modulus) such as a plastic material. Thus, such a member is only slightly deformed due to the load of the lens and the decentering of the optical device can be reduced. Therefore, good optical performance can be maintained.

In the case of the above design example 3, the barrel may be prepared using a cheaper material such as aluminum.

The present invention can be used for an optical apparatus having an optical device. In particular, the present invention can be suitably used for an optical apparatus having a large-sized optical device.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-268866 filed Oct. 17, 2008, which is hereby incorporated by reference herein in its entirety.

What is claimed is:

1. A holding apparatus for holding an optical element, the apparatus comprising:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is smaller than the linear expansion coefficient of the optical element;
the linear expansion coefficient of the first member is larger than the linear expansion coefficient of the optical element; and
the linear expansion coefficient of the second member is smaller than the linear expansion coefficient of the optical element.

2. A holding apparatus for holding an optical element, the apparatus comprising:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is larger than the linear expansion coefficient of the optical element;
the linear expansion coefficient of the first member is smaller than the linear expansion coefficient of the optical element; and
the linear expansion coefficient of the second member is larger than the linear expansion coefficient of the optical element.

3. An apparatus according to claim 1, wherein
the side of the optical element has a flat portion, and
the apparatus is configured such that the opposite end of the second member is in contact with the flat portion.

4. An apparatus according to claim 3, wherein
the second member includes a third member at the opposite end thereof, the third member having a first flat surface in contact with the flat portion.

5. An apparatus according to claim 4, wherein
the third member has a second flat surface opposite to the first flat surface, the second member includes a fourth member in a spherical convex shape in contact with the second flat surface.

6. An apparatus according to claim 1, wherein
a slot cut is formed in the first member.

7. An apparatus according to claim 1, further comprising:
a spacer arranged between the opposite end of the first member and the one end of the second member.

8. An apparatus according to claim 1, wherein
the first member includes a lid member including the opposite end of the first member, the lid member being fixed with the one end of the second member, and
the apparatus further comprising:
a fixing member detachably fixing the lid member with the opposite end of the first member.

9. An apparatus according to claim 4, wherein
a pair of the second members are arranged with respect to the flat portion.

10. An apparatus according to claim 1, wherein
a plurality of sets of the first members and the second members are arranged with respect to the side of the optical element.

11. An apparatus according to claim 10, wherein
a plurality of sets of the first members and the second members are arranged symmetrically with respect to a plane that includes a direction of gravity and a direction of the axis of the barrel inclined from the direction of gravy.

12. An apparatus according to claim 11, wherein
any one of the plurality of sets is not arranged on the plane.

13. An apparatus according to claim 10, wherein
the plurality of sets are arranged at unequal angular intervals.

14. An apparatus according to claim 1, further comprising:
an elastic member arranged between the opposite end of the first member and the one end of the second member to which a load of the optical element does not act when the axis of the barrel is inclined from a direction of gravity, and configured to bias the second member to the optical element.

15. An apparatus according to claim 1, further comprising:
a heat-insulating member covering the first member.

16. An apparatus according to claim 1, further comprising:
a heater configured to heat the first member.

17. An apparatus according to claim 1, wherein each of the first member and the second member has a Young's modulus not smaller than 30 GPa.

18. A telescope comprising:
an optical element; and
a holding apparatus holding the optical element,
wherein the holding apparatus includes:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is smaller than the linear expansion coefficient of the optical element,
the linear expansion coefficient of the first member is larger than the linear expansion coefficient of the optical element, and
the linear expansion coefficient of the second member is smaller than the linear expansion coefficient of the optical element.

19. A telescope comprising:
an optical element; and
a holding apparatus holding the optical element,
wherein the holding apparatus includes:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is larger than the linear expansion coefficient of the optical element,
the linear expansion coefficient of the first member is smaller than the linear expansion coefficient of the optical element, and
the linear expansion coefficient of the second member is larger than the linear expansion coefficient of the optical element.

20. An optical apparatus comprising:
an optical element; and
a holding apparatus holding the optical element,
wherein the holding apparatus includes:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is smaller than the linear expansion coefficient of the optical element,
the linear expansion coefficient of the first member is larger than the linear expansion coefficient of the optical element, and
the linear expansion coefficient of the second member is smaller than the linear expansion coefficient of the optical element.

21. An optical apparatus comprising:
an optical element; and
a holding apparatus holding the optical element,
wherein the holding apparatus includes:
a barrel having a hole on a side thereof and housing the optical element;
a first member having one end connected to the barrel, and an opposite end located apart from the one end in a direction perpendicular to an axis of the barrel and outside the barrel;
a second member passing through the hole and having one end connected to the opposite end of the first member, and an opposite end located apart from the opposite end of the first member in the direction and inside the barrel,
wherein a linear expansion coefficient of the barrel, a linear expansion coefficient of the first member, a linear expansion coefficient of the second member, a dimension of the barrel in the direction, a dimension of the first member in the direction, and a dimension of the second member in the direction are configured so that the opposite end of the second member is in contact with a side of the optical element, and an amount of displacement of the side of the optical element and an amount of displacement of the opposite end of the second member due to a change in temperature correspond to each other, and wherein
the linear expansion coefficient of the barrel is larger than the linear expansion coefficient of the optical element,
the linear expansion coefficient of the first member is smaller than the linear expansion coefficient of the optical element, and
the linear expansion coefficient of the second member is larger than the linear expansion coefficient of the optical element.

* * * * *